US012793736B2

(12) United States Patent
Hatakeyama et al.

(10) Patent No.: US 12,793,736 B2
(45) Date of Patent: Nov. 10, 2026

(54) MAGNETIC DISK SUBSTRATE AND MAGNETIC DISK USING THE SAME

(71) Applicants: FURUKAWA ELECTRIC CO., LTD., Tokyo (JP); UACJ Corporation, Tokyo (JP)

(72) Inventors: Hideyuki Hatakeyama, Tokyo (JP); Shimpei Todo, Tokyo (JP); Kotaro Kitawaki, Tokyo (JP); Koichiro Takiguchi, Tokyo (JP)

(73) Assignees: FURUKAWA ELECTRIC CO., LTD., Tokyo (JP); UACJ CORPORATION, Tokyo (JP)

( * ) Notice: Subject to any disclaimer, the term of this patent is extended or adjusted under 35 U.S.C. 154(b) by 0 days.

(21) Appl. No.: 18/757,992

(22) Filed: Jun. 28, 2024

(65) Prior Publication Data

US 2024/0355357 A1 Oct. 24, 2024

Related U.S. Application Data

(63) Continuation of application No. PCT/JP2023/000342, filed on Jan. 10, 2023.

(30) Foreign Application Priority Data

Jan. 11, 2022 (JP) ................................ 2022-002122

(51) Int. Cl.
*G11B 5/73* (2006.01)
*G11B 5/735* (2006.01)
(Continued)

(52) U.S. Cl.
CPC ........ *G11B 5/73921* (2019.05); *G11B 5/7358* (2019.05); *G11B 5/739* (2019.05);
(Continued)

(58) Field of Classification Search
CPC ..... G11B 5/7358; G11B 5/73921; G11B 5/82; G11B 5/84; G11B 5/8404
See application file for complete search history.

(56) References Cited

U.S. PATENT DOCUMENTS 5,441,788 A * 8/1995 Bloomquist ......... G11B 5/8404 428/654
2001/0041271 A1* 11/2001 Watanabe ............... C03C 19/00 428/848.3
(Continued)

FOREIGN PATENT DOCUMENTS

JP 7-228044 A 8/1995
JP 07226044 A * 8/1995 ............. G11B 5/743
(Continued)

OTHER PUBLICATIONS

Yoon et al. "Operational Shock Analysis for 2.5-in Multi-Disk HDD Considering Ramp-Disk Gap Irregularity." IEEE Transactions on Magnetics, vol. 53, No. 3, 2017, pp. 1-4.*
(Continued)

*Primary Examiner* — Holly Rickman
*Assistant Examiner* — Lisa Chau
(74) *Attorney, Agent, or Firm* — Birch, Stewart, Kolasch & Birch, LLP

(57) ABSTRACT

A magnetic disk substrate having a pair of front and back principal surfaces, containing fixed portions that are in contact with fixing jigs when the magnetic disk substrate configured as a magnetic disk is incorporated in a hard disk device on the respective front and back principal surfaces, wherein a root mean square deviation Rq of surface roughnesses of the fixed portions on the respective front and back principal surfaces is from 0.01 to 0.44 μm.; and a magnetic disk using the same.

3 Claims, 6 Drawing Sheets

(51) Int. Cl.
*G11B 7/253* (2013.01)
*G11B 7/2531* (2013.01)
*G11B 7/2532* (2013.01)

(52) U.S. Cl.
CPC .......... *G11B 5/73919* (2019.05); *G11B 7/253* (2013.01); *G11B 7/2531* (2013.01); *G11B 7/2532* (2013.01)

(56) References Cited

U.S. PATENT DOCUMENTS

| | | | | |
|---|---|---|---|---|
| 2004/0038082 | A1 * | 2/2004 | Tsumori | G11B 5/8404 428/832 |
| 2020/0035268 | A1 * | 1/2020 | Osakabe | G11B 5/73917 |
| 2023/0238027 | A1 * | 7/2023 | Kitawaki | G11B 5/84 428/846.7 |
| 2023/0298623 | A1 | 9/2023 | Osakabe | |

FOREIGN PATENT DOCUMENTS

| | | | | |
|---|---|---|---|---|
| JP | 6467118 | B1 | 2/2019 | |
| WO | WO 2014/069609 | A1 | 5/2014 | |
| WO | WO-2022004826 | A1 * | 1/2022 | B32B 15/20 |

OTHER PUBLICATIONS

International Preliminary Report on Patentability, dated Jun. 20, 2024, and Written Opinion of the International Searching Authority, dated Apr. 4, 2023, for International Application No. PCT/JP2023/000342, with English translation.
International Search Report for International Application No. PCT/JP2023/000342, dated Apr. 4, 2023, with English translation.
Japanese Office Action for Japanese Application No. 2023-574033, dated Apr. 1, 2025, with English translation.

* cited by examiner

MAGNETIC DISK SUBSTRATE AND MAGNETIC DISK USING THE SAME

CROSS-REFERENCE TO RELATED APPLICATIONS

This application is a Continuation of PCT International Application No. PCT/JP2023/000342 filed on Jan. 10, 2023, which claims priority under 35 U.S.C. § 119 (a) to Japanese Patent Application No. 2022-002122 filed in Japan on Jan. 11, 2022. Each of the above applications is hereby expressly incorporated by reference, in its entirety, into the present application.

TECHNICAL FIELD

The present invention relates to a magnetic disk substrate that has high strength and satisfactory impact resistance, and a magnetic disk using the same.

BACKGROUND ART

Recently, a storage device (that includes a hard disk device, such as a hard disk drive) has been demanded to have large capacity and high density to meet an increase in needs, such as for multimedia that collectively handles a plurality of kinds of information (a text, a video, and music) or the like. The large capacity of the hard disk device is achievable by an increase in the number of loaded magnetic disks included in the hard disk device or the like. For example, there is a hard disk device that stacks and loads a plurality of the magnetic disks. In the hard disk device, simply increasing the number of loaded magnetic disks requires a large-sized hard disk device. However, there is a case where a size of a housing for a hard disk device is standardized, and significantly changing the size is difficult. In view of this, thinning a magnetic disk substrate that occupies the most part of a thickness of the magnetic disk has been demanded.

The magnetic disk mounted on (equipped with) the hard disk device is generally created by disposing a magnetic layer or the like on a principal surface of a disc-shaped magnetic disk substrate. As the magnetic disk substrate, various kinds of the magnetic disk substrates have been proposed. For example, Patent Literature 1 discloses a magnetic disk substrate that includes a substrate main body having two principal surfaces and a film of a metal material having a specific coefficient of loss, has a thickness including the film of 0.7 mm or less, and in which the film covers a whole surface of the substrate. In an end surface of the magnetic disk substrate, a thickness of the film is thicker than a film thickness of the film on the principal surface.

CITATION LIST

Patent Literatures

Patent Literature1: Japanese Patent No. 6467118

SUMMARY OF INVENTION

Technical Problem

In the hard disk device, generally, information recorded to the magnetic disk is read by a magnetic head. In the hard disk drive, while the hard disk drive stops, this magnetic head is evacuated from a storage area of the magnetic disk to prevent a contact between the magnetic head and the storage area of the magnetic disk. As one method of this evacuation, there is a method that evacuates the magnetic head on a ramp (ramp loading method). In this method, the ramp is disposed to project out on the principal surface of the magnetic disk.

As described above, for thinning the magnetic disk, thinning the magnetic disk substrate has been demanded. However, if the magnetic disk substrate is thinned, when the magnetic disk substrate is incorporated in the hard disk device as the magnetic disk, due to an impact from outside the hard disk device, the magnetic disk significantly vibrates in some cases. When a swing width of this vibration is large, the magnetic disk, more specifically the magnetic disk substrate itself, or magnetic layer or the like formed on the magnetic disk substrate collides with a circumferential member (external member), such as the ramp, disposed to project out on the principal surface of the magnetic disk or the adjacent magnetic disk. When the collision occurs, failures, such as the member in contact with the magnetic disk being scraped and generating particles, a defect, such as a scratch, being generated on the magnetic disk surface, and the like are likely to occur. Therefore, the magnetic disk substrate that can be configured as the magnetic disk that suppresses vibration and has excellent impact resistance has been demanded.

Meanwhile, to increase the number of loaded magnetic disks to the hard disk device, further narrowing a gap between the principal surface of the magnetic disk and the ramp has been examined.

The magnetic disk substrate described in Patent Literature1 was developed assuming that the gap between the principal surface of the magnetic disk and the ramp to be 0.2 mm (200 μm). Patent Literature1 describes that when impact of 120 G (1177 $m/s^2$) is given for 2 msec, the number of times that an amount of displacement of an outer circumferential end portion of the magnetic disk substrate in a plate thickness direction becomes 0.2 mm or more can be suppressed to 4 times or less. However, it cannot be always said that the magnetic disk substrate described in Patent Literature1, to meet the large capacity of the hard disk device, can meet a configuration (for example, a configuration of the gap: 165 μm) in which the gap between the principal surface of the magnetic disk and the ramp is further narrowed from 200 μm while the magnetic disk substrate, for example, is thinned to a plate thickness of 0.5 mm or less.

An object of the present invention is to provide a magnetic disk substrate that allows meeting high capacity of the hard disk device (increase in the number of loadings) and improvement in impact resistance of the hard disk device, and a magnetic disk using the same.

Solution to Problem

The inventors seriously examined on impact resistance of a thinned magnetic disk focusing on a magnetic disk substrate occupying the most part of a thickness of the magnetic disk. Consequently, it has been found that, in the magnetic disk substrate having a pair of front and back principal surfaces, when the magnetic disk is configured, controlling surface roughness of a portion (fixed portion) in contact with a fixing jig when the magnetic disk is incorporated in the hard disk device is effective to suppress an amount of displacement due to external impact. Further examination based on the knowledge found that, among physical properties that characterize the surface roughness of the fixed portion of the magnetic disk substrate having the pair of principal surfaces, setting each of root mean square deviations Rq of the surface roughnesses to 0.01 to 0.44 μm allows achieving impact resistance equivalent to or more than a case of using a magnetic disk substrate having a plate thickness exceeding 0.5 mm even with, for example, the magnetic disk substrate having the plate thickness thinned to 0.5 mm or less. The present invention is based on the above findings, and after further investigation, has been completed.

That is, the problems of the present invention have been solved by the following means.

[1]

A magnetic disk substrate having a pair of front and back principal surfaces, containing:

fixed portions that are in contact with fixing jigs when the magnetic disk substrate configured as a magnetic disk is incorporated in a hard disk device on the respective front and back principal surfaces, wherein a root mean square deviation Rq of surface roughnesses of the fixed portions on the respective front and back principal surfaces is from 0.01 to 0.44 μm.

[2]

The magnetic disk substrate described in [1], wherein an absolute value of a difference ΔRq of Rq of the fixed portions of the front and back principal surfaces is from 0.01 to 0.11 μm.

[3]

The magnetic disk substrate described in [1] or [2], wherein when impact is given by the following impact test, the maximum value H of the amount of displacement in the plate thickness direction of the outer circumferential end portion of the magnetic disk substrate is 165 μm or less, and the attenuation rate E of the amount of displacement is 17.7 μm/msec or more:

<Impact Test> in a state where the magnetic disk substrate is sandwiched from above and below by fixing jigs at the fixed portions and horizontally fixed to a bearing with the impact of 490 $m/s^2$ for 2.8 msec is given to the bearing from downward in the normal direction of the principal surface of the magnetic disk substrate.

[4]

The magnetic disk substrate described in any one of [1] to [3], which is a disc-shaped magnetic disk substrate having an outer diameter of 97 mm or more, an inner diameter of 26 mm or less and a plate thickness of 0.5 mm or less.

[5]

A magnetic disk, containing the magnetic disk substrate described in any one of [1] to [4].

In the present invention, the numerical ranges expressed with the term "to" refer to ranges including, as the lower limit and the upper limit, the numerical values before and after the term "to".

Advantageous Effects of Invention

By the use of the above-described magnetic disk substrate for producing the magnetic disk, when the magnetic disk is incorporated in the hard disk device, a contact between the magnetic disk and an external member, such as a ramp, generated by impact received from outside is reduced, and particles of a surface of the magnetic disk, a scratch, and a defect are less likely to occur. In view of this, even when a plate thickness of the magnetic disk substrate is thinned, impact resistance can be improved in the hard disk device in which a distance to the external member is reduced. The magnetic disk of the present invention can improve the impact resistance when incorporated in the hard disk device.

BRIEF DESCRIPTION OF DRAWINGS

In FIG. 7(*a*), the magnetic disk substrate is in a motionless state, and in FIG. 7(*b*), the magnetic disk substrate deforms due to vibration and warps downward in a plate thickness direction.

DESCRIPTION OF EMBODIMENTS

Figure 1:
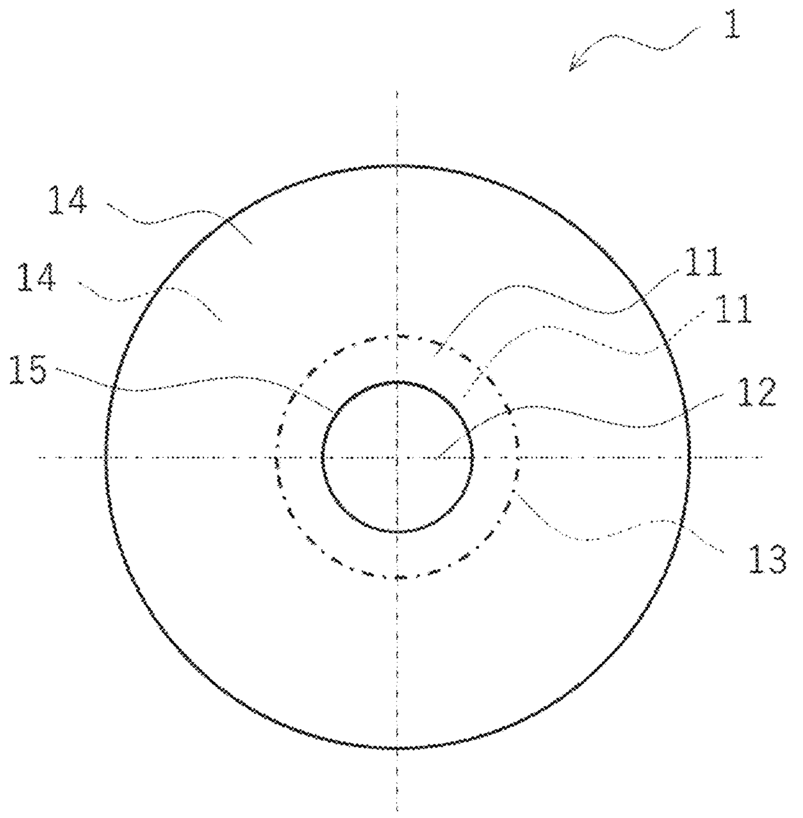
FIG. 1 is a plan view of an example of a magnetic disk substrate in a principal surface normal direction in plan view.
Figure 2:
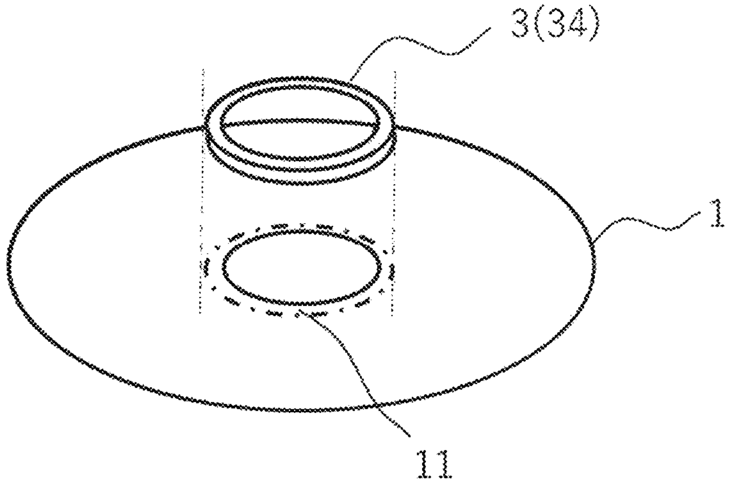
FIG. 2 is a schematic diagram illustrating an example of arrangement of a fixed portion of the magnetic disk substrate and a fixing jig.
Figure 3:
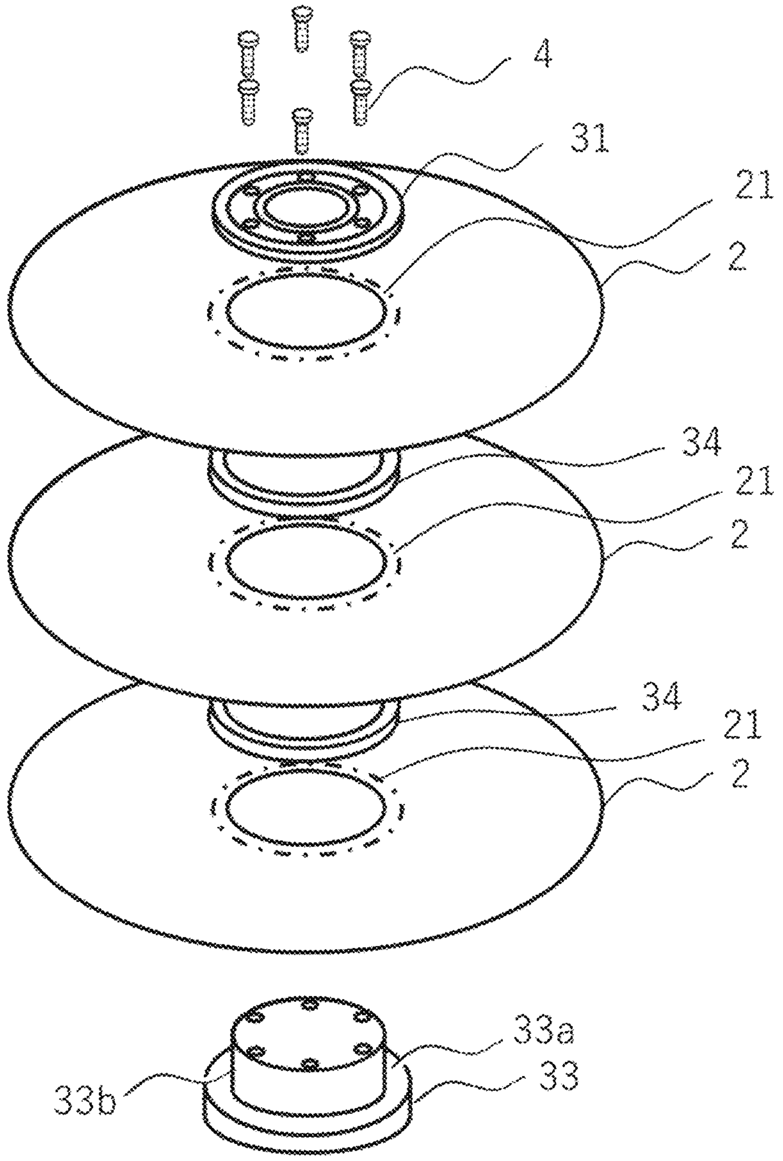
FIG. 3 is an exploded perspective view illustrating an example of a configuration of incorporation (loading) of the magnetic disks to a hard disk device.

The following describes a magnetic disk substrate and a magnetic disk according to one embodiment of the present invention with reference to FIGS. 1 to 3.

A magnetic disk substrate 1 is a substrate used for producing a magnetic disk 2 and generally having a disc shape or an annular shape.

FIG. 1 is a plan view of an example of the magnetic disk substrate in a principal surface normal direction in plan view.

The magnetic disk substrate 1 illustrated in FIG. 1 has the disc shape and a circular hole 12 at the center. The magnetic disk substrate 1 can have a disc shape without the circular hole 12 but preferably has the disc shape having the circular hole 12 at the center.

The magnetic disk substrate 1 has a pair of front and back principal surfaces 14.

The magnetic disk substrate 1 includes respective fixed portions 11 on two, namely, front and back principal surfaces 14. The fixed portion 11 means a portion in contact with a fixing jig 3 when the magnetic disk substrate 1 configured as the magnetic disk 2 is incorporated in the hard disk device.

The fixed portion 11 is an (concentric) annular portion partitioned into an inner edge disposed on an inner circumferential end portion 15 of the magnetic disk substrate 1 and an outer edge (imaginary line 13) disposed in a (concentric)

circle shape at a distance of 32 mm or less, preferably 30 mm or less, from the center of the magnetic disk substrate 1. For use for a 2.5-inch hard disk device, the fixed portion 11 is an annular portion partitioned into an inner edge disposed on the inner circumferential end portion 15 of the magnetic disk substrate 1 and an outer edge (imaginary line 13) disposed in a circle at a distance of 29 mm or less, preferably 27 mm or less, from the center of the magnetic disk substrate 1. In FIG. 1, the inner diameter of the fixed portion 11 matches the inner diameter of the magnetic disk substrate 1. However, the inner diameter of the fixed portion 11 can be a diameter slightly larger than the inner diameter of the magnetic disk substrate 1. The outer diameter of the fixed portion 11 can be set so as to match the outer diameter of the fixing jig 3 used to fix the magnetic disk 2, and can be the same as, slightly larger than, or slightly smaller than the outer diameter of the fixing jig 3. To use the magnetic disk substrate 1 as the magnetic disk 2, a magnetic layer is formed outside in a direction from the center of the fixed portion 11 toward the outer circumference (radial direction). Meanwhile, on the fixed portion 11 of the magnetic disk substrate 1, a magnetic layer is not formed. In this meaning, to use the magnetic disk substrate 1 as the magnetic disk 2, the fixed portion 11 of the magnetic disk substrate 1 can be equated to a fixed portion 21 of the magnetic disk 2.

In the present invention, as illustrated in FIG. 3 as an example, the fixing jig 3 means a member disposed in a configuration of in contact with the fixed portion 11 of the magnetic disk substrate 1 (fixed portion 21 of the magnetic disk 2) when the magnetic disk substrate 1 configured as the magnetic disk 2 is incorporated in the hard disk device. The fixing jig 3 ordinarily has a configuration of the disc shape or the annular shape in plan view. The fixing jig 3 only needs to be a member ordinarily used when the magnetic disk 2 is incorporated in the hard disk device and is a disc clamper 31, a large-diameter portion 33*a* disposed in a bearing (also referred to as a large-diameter portion of a bearing), a spacer 34, and the like. The fixing jig 3 can be made from an aluminum alloy.

FIG. 2 illustrates an example of disposing the fixing jig 3 on the fixed portion 11 of one principal surface. In FIG. 2, the fixed portion 11 and the fixing jig 3 (34) have the same shape in plan view, and although separated in FIG. 2, the fixing jig 3 (34) is disposed in contact with the fixed portion 11. A configuration of arrangement of the fixed portion 11 and the fixing jig 3 when the magnetic disk 2 is incorporated in the hard disk device is not particularly limited as long as the position where the fixing jig 3 is disposed is inside the fixed portion 11 in plan view. The fixing jig 3 may be in contact with the entire fixed portion 11 in plan view and may be in partial contact with the fixed portion 11 in plan view.

The magnetic disk substrate 1 configured as the magnetic disk 2 is incorporated in the hard disk device or the like in a state of being fixed with the fixed portion 21. More specifically, in the fixed portion 21, the magnetic disk substrate 1 is fixed to the bearing of the hard disk device by being sandwiched by the fixing jigs 3 from above and below in the thickness direction. FIG. 3 illustrates an exploded perspective view that schematically illustrating an example of a configuration of the magnetic disk 2 being incorporated in the hard disk device. Specifically, FIG. 3 illustrates an example of the configuration of the arrangement of the magnetic disk 2 when the three magnetic disks 2 are incorporated. In FIG. 3, the three magnetic disks 2 are disposed in the order illustrated in FIG. 3 together with the fixing jigs 3 (the disc clamper 31, the large-diameter portion 33*a* of the bearing, and the spacers 34). By screwing six mounting screws 4 to a bearing 33 from the disc clamper 31 side, the three magnetic disks 2 are supported by the large-diameter portion 33*a* of the bearing 33 and are fixed to the bearing 33 via the two spacers 34. A core 33*b* of the bearing is inserted into the circular holes of the magnetic disks 2 and circular holes of the spacers 34. The outer diameter of the fixed portion 21 on the magnetic disk 2, the diameter of the large-diameter portion 33*a* of the bearing, the outer diameter of the spacer 34, and the diameter of the disc clamper 31 are the same. The inner diameter of the magnetic disk 2 and the inner diameter of the spacer 34 are the same. The diameter of the core 33*b* of the bearing has a size that is not for a gap in both cases of the magnetic disk 2 and the spacer 34 being inserted. After screwing with the mounting screws 4, the three magnetic disks 2 are incorporated in the configuration in contact with the large-diameter portion 33*a* of the bearing, the two spacers 34, and the disc clamper 31 at the fixed portions 21. From the aspect of illustrating the configuration of incorporation briefly, FIG. 3 does not illustrate the magnetic layer included in the magnetic disk 2, or the external members, such as the magnetic head and the ramp, the housing, and the like.

The configuration of the incorporation is not limited to the configuration and can be an ordinary configuration of incorporation including the above-described configuration. For example, the spacer 34 may be further disposed between the large-diameter portion 33*a* of the bearing and the magnetic disk 2.

The magnetic disk substrate 1 of the present invention has respective root mean square deviations Rq of the surface roughnesses of the two fixed portions 11, 11 of the two principal surfaces 14, 14 from 0.01 to 0.44 μm. When the root mean square deviation Rq of the surface roughness is in the range, when the magnetic disk substrate 1 configured as the magnetic disk 2 is incorporated in the hard disk device, vibration of the magnetic disk 2 is suppressed and impact resistance can be enhanced. It is considered that, by controlling and adjusting Rq of the surface roughness of the fixed portion 11 within the range, a fulcrum distribution of the deformation of the magnetic disk substrate 1 at the impact (also referred to as a difference in the amount of displacement) becomes more uniform, and deformation due to the impact at the outermost circumferential portion of the magnetic disk substrate 1 decreases. The root mean square deviation Rq of the surface roughness of the fixed portion 11 is preferably from 0.10 to 0.44 μm and more preferably from 0.15 to 0.40 μm. The root mean square deviation Rq of the surface roughness of the fixed portion 11 can be from 0.17 to 0.40 μm.

The root mean square deviation Rq of the surface roughness of the fixed portion 11 can be measured by the method described in Example compliant with JIS B 0601-2001. Even when the magnetic disk substrate 1 is configured as the magnetic disk 2, by measuring a square average roughness Rq of the surface roughness in the fixed portion 21 of the magnetic disk 2, the square average roughness Rq of the surface roughness in the fixed portion 11 of the magnetic disk substrate 1 can be measured. This is because the fixed portion 21 of the magnetic disk 2 and the fixed portion 11 of the magnetic disk substrate 1 are ordinarily the same.

Although the adjustment method of the root mean square deviation Rq of the surface roughness is not particularly limited, for example, in the polishing step, by performing polishing while supplying a polishing solution at 10 ml/minute or more per disk blank described later, diluting the polishing solution using water having electrical resistivity of 1 MΩ·cm or more, continuing stirring while supplying the polishing solution, performing cleaning on a pipe when the polishing solution is supplied to the polishing pad via the pipe such that the electrical resistivity of the water at an outlet of the pipe becomes to the extent of 1 MΩ·cm or more when the water having the electrical resistivity 10 MΩ·cm or more is supplied from an inlet of the pipe, and the like, the root mean square deviation Rq can be set in the range. Even when any of preparation methods is employed, Rq tends to decrease.

From the aspect of decreasing the electrical resistivity, the water used for dilution of the polishing solution is preferably pure water, and ion exchanged water and distilled water are more preferred.

An absolute value of the difference ΔRq of Rq between the two fixed portions 11 of the magnetic disk substrate 1 (that is, an absolute value of (Rq of the fixed portion 11 on the front surface side)−(Rq of the fixed portion 11 on the back surface side)) is preferably from 0.01 to 0.11 μm. Setting the absolute value of ΔRq in the range allows enhancing the attenuation rate of the vibration of the magnetic disk substrate 1. It is considered that, by uniformizing the surface roughnesses of the fixed portions 11 on the front and the back, the difference in the amount of displacement between above and below the substrate decreases, and the vibration more quickly attenuates.

From the aspect of further enhancing the attenuation rate, the absolute value of ΔRq is preferably from 0.01 to 0.08 μm, more preferably from 0.01 to 0.05 μm, and further preferably from 0.01 to 0.05 μm.

Although the adjustment method of the absolute value of ΔRq is not particularly limited, for example, in the polishing step, by supplying the polishing solution from an upper surface plate side, inverting the up and down of the disk blank and performing polishing for the same time, performing the inversion of the up and down in the plate thickness direction of the disk blank one time or more, and the like, the absolute value can be set in the range.

The plate thickness of the magnetic disk substrate 1 can be similar to the plate thickness of the ordinary magnetic disk substrate and can be further thinned. The plate thickness of the magnetic disk substrate 1 is preferably 0.50 mm or less. The lower limit of the plate thickness of the magnetic disk substrate 1 is not particularly limited, but is practically 0.30 mm or more.

The outer diameter of the magnetic disk substrate 1 can be similar to the outer diameter of the ordinary magnetic disk substrate. When the magnetic disk substrate 1 is used for the 2.5-inch hard disk device, the outer diameter of the magnetic disk substrate 1 is preferably 65 mm or more. The upper limit is restricted by an inside dimension of the housing of the hard disk device and is practically 70 mm or less. To use the magnetic disk substrate 1 for a 3.5-inch hard disk device, the outer diameter of the magnetic disk substrate 1 of the present invention is preferably 95 mm or more and more preferably 97 mm or more. The upper limit is restricted by an inside dimension of a case and is practically 101 mm or less.

The inner diameter of the magnetic disk substrate 1 can be similar to the inner diameter of the ordinary magnetic disk substrate. For use for the 2.5-inch hard disk device, the inner diameter of the magnetic disk substrate 1 of the present invention is preferably 22 mm or less. The lower limit is restricted by a diameter of a rotation shaft and is practically 18 mm or more. For use for a 3.5-inch hard disk, the inner diameter of the magnetic disk substrate 1 of the present invention is preferably 26 mm or less. The inner diameter can be 25 mm or less. The lower limit is restricted by the diameter of the rotation shaft and is practically 24 mm or more.

The preferred configuration of the magnetic disk substrate 1 is a configuration in which the outer diameter of 97 mm or more, the inner diameter of 26 mm or less, and the plate thickness of 0.5 mm or less.

The magnetic disk substrate 1 of the present invention especially provides the preferred effects when used for a hard disk drive having the following configurations and the following specifications.

Size of the magnetic disk substrate 1: outer diameter of 97 mm or less, inner diameter of 25 mm or less, and plate thickness of 0.5 mm or less Material: Al—Mg-based alloy or aluminosilicate glass Used aspect: magnetic recording disk Specification of the hard disk drive: 3.5-inch hard disk or the 2.5-inch hard disk (both are a ramp loading method)

Gap between the magnetic disk and the ramp: for example, less than 171 μm and more preferably 165 μm or less Since the magnetic disk substrate 1 satisfies the root mean square deviation Rq, when impact is given by the following impact test, the maximum value H of the amount of displacement in the plate thickness direction of the outer circumferential end portion of the magnetic disk substrate 1 and the attenuation rate E thereof can be suppressed in the following respective ranges. Thus, when the substrate 1 is incorporated in the hard disk device as the magnetic disk 2, even when vibration is generated, particles, a scratch of the surface of the magnetic disk, and a defect can be effectively suppressed.

<Impact Test>

In a state where one magnetic disk substrate 1 is sandwiched from above and below by the fixing jigs 3 (the disc clamper 31 and the spacer 34) at the fixed portions 11 and horizontally fixed to the bearing 33 with the impact of 490 $m/s^2$ for 2.8 msec is given to the bearing 33 from downward (from the bearing 33 side toward the disc clamper 31 side) in the normal direction (the plate thickness direction) of the principal surface 14 of the magnetic disk substrate 1.

In the impact test, the vertical direction means the plate thickness direction of the magnetic disk substrate (sandwiching direction) and the "up (side)" means the disc clamper 31 side and "down (side)" means the bearing 33 side.

Figure 8:
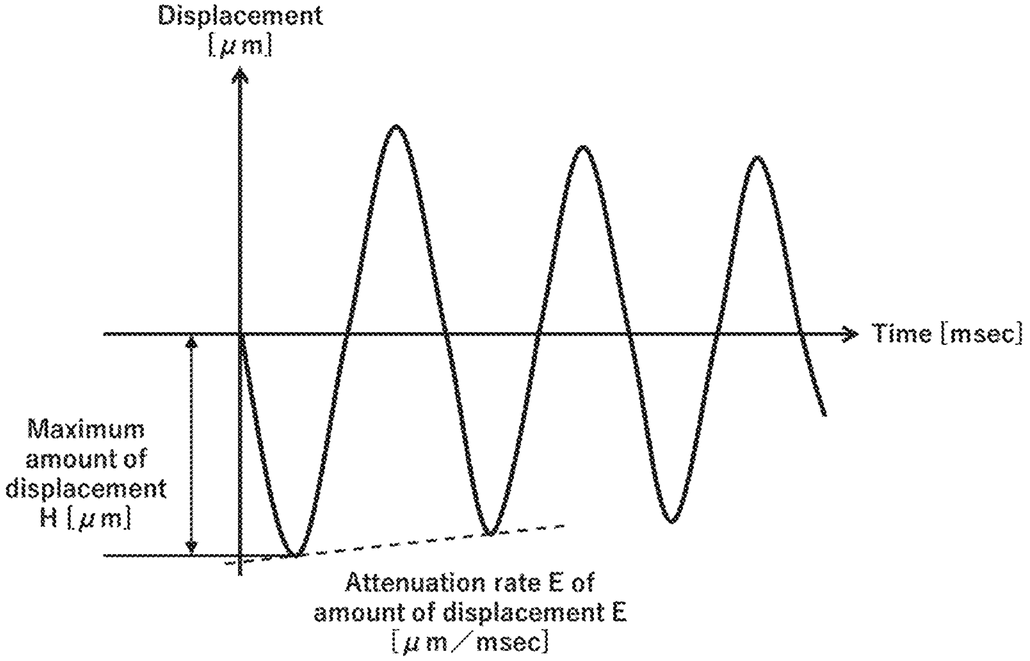
FIG. 8 is a schematic diagram describing ways of obtaining the maximum amount of displacement H and the attenuation rate E of amount of displacement obtained in Example.

The maximum value H of the amount of displacement means an absolute value (μm) of displacement that significantly drops below first when the magnetic disk substrate 1 is vibrated by impact by the impact test and the amount of displacement in the plate thickness direction of the outer circumferential end portion by the impact is plotted to time as illustrated in FIG. 8 to make a graph of the amount of displacement-time. The attenuation rate E of amount of displacement means an inclination (μm/msec) when apexes of displacement at which displacement significantly drops at the first time and the second time in the graph are connected.

The impact test can be specifically performed by a method described in Example. While the impact test is performed using the magnetic disk substrate 1 in which a magnetic layer is not formed, the magnetic layer is generally a thin film, and therefore the rigidity does not substantially affect the maximum value H of amount of displacement and the attenuation rate E.

When the magnetic disk substrate 1 is vibrated by the impact test, the maximum value H of amount of displacement in the plate thickness direction of the outer circumferential end portion of the magnetic disk substrate 1 is preferably 165 μm or less.

The maximum value H of the amount of displacement is preferably 164 μm or less, more preferably 150 μm or less, and further preferably 130 μm or less. The lower limit of the maximum value H of the amount of displacement is not particularly limited, but is practically 100 μm or more.

When the magnetic disk substrate 1 is vibrated by the impact test, the attenuation rate E of amount of displacement in the plate thickness direction of the outer circumferential end portion of the magnetic disk substrate 1 is preferably 17.7 μm/msec or more. The upper limit of the attenuation rate E is not particularly limited, but is practically 30 μm/msec or less.

The magnetic disk substrate 1 more preferably has a configuration in which the maximum value H of amount of displacement is 165 μm or less and the attenuation rate E of amount of displacement is 17.7 μm/msec or more.

Note that when the magnetic disk substrate 1 is configured as the magnetic disk 2, the amount of displacement H and the attenuation rate E measured by the same method except that the magnetic disk 2 is used can be regarded as the amount of displacement H and the attenuation rate E of the magnetic disk substrate 1. As described above, this is because the magnetic layer does not affect these measurement values.

The conditions for the impact test are conditions that reproduce impact in actual use when the hard disk device is fixed to an HDD mounting rack, a computer, or the like (such as impact when a hard disk device terminal is inserted into a terminal, such as a blade, and when the blade is pushed into a far side while sliding a side guide of a blade server and the blade reaches a farther side). To reproduce this impact, in the present invention, an action time was set to 2.8 msec and a maximum acceleration (applied acceleration) was set to 490 $m/s^2$. In Patent Literature1 as well, the impact test was performed. However, in the test described in Patent Literature1 in which the impact of the action time of 2 msec and the maximum acceleration of 120 G (1177 $m/s^2$) is given, the action time is too short, and the impact when the objective hard disk device is fixed to the HDD mounting rack, the computer, or the like cannot be reproduced.

Figure 9:
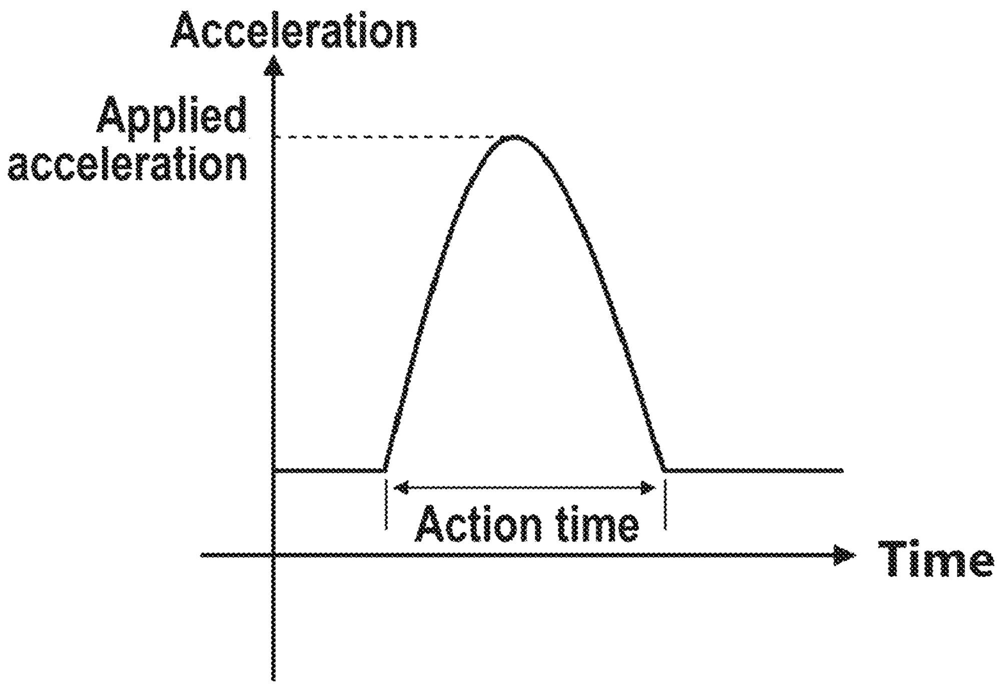
FIG. 9 is an explanatory view illustrating an example of an impact pulse applied in an impact test.

FIG. 9 illustrates an explanatory diagram of the impact pulse used for the impact test. The vertical axis indicates the acceleration, and the horizontal axis indicates the time. The impact pulse is formed of the applied acceleration G (equivalent to the maximum acceleration) and the action time.

The magnetic disk 2 of the present invention is a magnetic disk obtained by using the magnetic disk substrate 1.

The magnetic disk substrate 1 of the present invention can be used as the magnetic disk 2 by forming the magnetic layer on at least one of the principal surfaces 14. The magnetic layers are preferably formed on both of the principal surfaces 14.

The structure of the magnetic disk 2 can be the structure similar to the ordinary magnetic disk except that the fixed portions 21 are disposed.

The description for the fixed portion 11 can be applied to the fixed portion 21, the fixed portion 21 can have the root mean square deviation Rq of the surface roughness, the inner diameter, and the outer diameter similar to those of the fixed portion 11, and has the preferred aspects similar to those of the fixed portion 11.

The magnetic layer can have the structure similar to that of the ordinary magnetic disk.

The thickness of the magnetic layer is not particularly limited, but preferably 1 to 100 nm.

In the magnetic disk 2 obtained using the magnetic disk substrate 1 of the present invention, the substrate 1 has the properties. Therefore, in addition to the ordinary 3.5-inch hard disk, the magnetic disk 2 can be used for a nominal 2.5-inch or 3.5-inch hard disk for which further severe impact resistance is requested.

As the main thicknesses of a housing for the 2.5-inch hard disk, 7 mm, 9.5 mm, and 12.5 mm, and as the main thickness of a housing for the 3.5-inch hard disk, 20 mm, 26 mm, and the like are known.

When the plate thickness of the magnetic disk 2 is 0.5 mm, the number of the magnetic disks 2 that can be mounted on the ordinary housing for 3.5-inch hard disk having the thickness of 26 mm is 9 or less. However, by configuring the plate thickness of the magnetic disk 2 to be less than 0.5 mm, 10 or more magnetic disks can be mounted on the hard disk without the thickness of the housing significantly exceeding from 26 mm.

In the ordinary hard disk drive, a gap between the principal surface of the magnetic disk and the external member, such as the ramp, on the side same as the principal surface is set to around 200 μm in some cases. The use of the magnetic disk substrate 1 of the present invention allows further reducing the gap between the magnetic disk 2 and the external member. Thus, the many magnetic disks can be mounted on the hard disk device. According to the present invention, the gap can be a 170 μm and a further narrow gap, such as 165 μm.

As the material of the magnetic disk substrate 1, generally, a material excellent in a mechanical property and workability is used, and specifically, an aluminum alloy and glass can be preferably used. Especially, with the substrate of the present invention in which the root mean square deviation Rq of the substrate 1 is set to the range, the conventional aluminum alloy and glass used as the material of the substrate can be used without being particularly limited. Hereinafter, the magnetic disk substrate produced using the aluminum alloy is referred to as an aluminum alloy substrate and the magnetic disk substrate produced using the glass is referred to as a glass substrate in some cases.

<Aluminum Alloy Substrate>

First, the aluminum alloy substrate is described below.

As the aluminum alloy of the substrate material, an Al—Mg-based alloy, an Al—Fe—Mn—Ni-based alloy, and an Al—Fe—Mn—Mg—Ni-based alloy can be preferably used but are not limited thereto.

As the Al—Mg-based alloy, for example, JIS5086 (A5086) (containing Mg: 3.5 to 4.5 mass %, Fe: 0.50 mass % or less, Si: 0.40 mass % or less, Mn: 0.20 to 0.70 mass %, Cr: 0.05 to 0.25 mass %, Cu: 0.10 mass % or less, Ti: 0.15 mass % or less, and Zn: 0.25 mass % or less, with the balance being Al and inevitable impurities) can be used.

The following will describe an example of an aluminum alloy substrate for magnetic disk and a producing method of the magnetic disk using it.

As long as the producing method of the aluminum alloy substrate for magnetic disk is a method that allows producing the magnetic disk substrate in which the root mean square deviation Rq of the surface roughness is in the range, the method is not particularly limited. From the aspect of the root mean square deviation Rq of the surface roughness in the range, the producing method of the aluminum alloy substrate for magnetic disk at least preferably includes a step of rough polishing a principal surface using a polishing solution containing polishing grains having a particle diameter of 0.03 μm or more and 1.0 μm or less (can be the particle diameter of 0.1 μm or more and 1.0 μm or less) and an average grain size of 0.2 μm or more and 0.85 μm or less and a hard or soft polishing pad, and subsequently a step of fine polishing the principal surface using the polishing solution containing the polishing grains having the particle diameter of 0.01 μm or more and less than 0.1 μm and an average grain size of 0.02 μm or more and 0.08 μm or less and a soft polishing pad.

The rough polishing step corresponds to step S111 described below, and the fine polishing step corresponds to step S112 described below. The details of the rough polishing step and the fine polishing step can be referred to as the description in steps S111 and S112.

The rough polishing step and/or the fine polishing step is preferably a step that performs at least one step among the following preferred steps.

The rough polishing step and/or the fine polishing step is preferably a step that performs polishing while supplying the polishing solution from the upper surface plate side to the polishing pad.

The rough polishing step and/or the fine polishing step is preferably a step that performs polishing while supplying the polishing solution of 10 ml/minute or more per disk blank described later.

The rough polishing step and/or the fine polishing step is preferably a step that uses the polishing solution diluted using water having the electrical resistivity of 1 MΩ·cm or more.

In the rough polishing step and/or the fine polishing step, the polishing solution under stirring is preferably supplied to the polishing pad.

In the rough polishing step and/or the fine polishing step, in the middle of the polishing step, the up and down in the plate thickness direction of the disk blank is preferably inverted one time or more.

Prior to the rough polishing step and/or the fine polishing step, when a water having the electrical resistivity of 10 MΩ·cm or more is supplied from the inlet of the pipe to which the polishing solution being supplied, cleaning is preferably performed such that the electrical resistivity becomes to the extent of 1 MΩ·cm or more at the outlet of the pipe.

Figure 4:
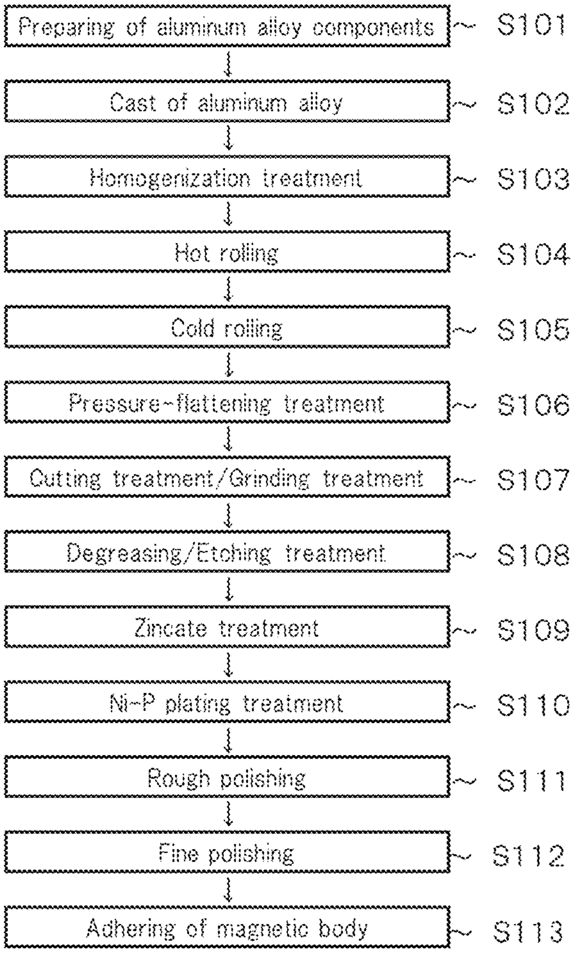
FIG. 4 is a flowchart illustrating a producing method of a magnetic disk aluminum alloy substrate, and a magnetic disk using the same according to the present invention.

FIG. 4 is a flowchart illustrating an example of a producing method of the aluminum alloy substrate and the magnetic disk using the same. In FIG. 4, a production step of aluminum alloy (step S101) to a cold rolling (step S105) are steps for producing an aluminum alloy material by melting and casting, making the aluminum alloy material into an aluminum alloy plate. Then, in a pressure-flattening step (step S106), an aluminum alloy disk blank is produced. Furthermore, the produced disk blank is subjected to preprocessing such as cutting treatment/grinding treatment (step S107) and degreasing/etching treatment (step S108), and, then, a zincate treatment (step S109), a Ni—P plating treatment (step S110), a rough polishing step (step S111) and a fine polishing step (step S112) are carried out. Thus, a magnetic disk aluminum alloy substrate is produced. The produced magnetic disk aluminum alloy substrate is subjected to a magnetic body adhering step (step S113). Thus, a magnetic disk is produced.

The content of each step is described below in detail in accordance with FIG. 4.

Firstly, molten aluminum alloy material having the composition described above is prepared by heating and melting according to ordinarily methods (step S101).

Next, the prepared molten aluminum alloy material is cast by a semi-continuous casting (DC casting) method, a continuous casting (CC casting) method, or the like to cast the aluminum alloy material (step S102). The DC casting may be vertical semi-continuous casting or horizontal semi-continuous casting. Producing conditions and the like of the aluminum alloy material in the DC casting method and the CC casting method are as described below.

In the DC casting method, molten metal poured through a spout is deprived of heat and solidified by a bottom block and walls of a water-cooled mold, and by cooling water discharged directly onto an outer periphery of the ingot; and is drawn downward as an ingot of the aluminum alloy. The ingot obtained in this step is referred to as a slab in some cases. Meanwhile, in the CC casting method, the molten metal is supplied between a pair of rolls (or belt casters or block casters) through a casting nozzle, and a thin plate of aluminum alloy is cast directly as a result of heat removal by the rolls.

A significant difference between the DC casting method and the CC casting method is the cooling rate when casting. The CC casting method, which has a high cooling rate, is characterized in that the size of the second phase particles is smaller than in DC casting.

Next, the aluminum alloy ingot produced by the DC cast is hot rolled to obtain a plate material (step S104). Prior to this hot rolling, homogenization treatment can be performed as necessary on the DC-casted aluminum alloy ingot (step S103). Regarding the CC casting, these steps are not performed and a step S105 is performed subsequent to the step S102.

When performing the homogenization treatment as the step S103, it is preferable that heat treating at 280 to 620° C. is performed for 0.5 to 30 hours, and it is more preferable that heat treating at 300 to 620° C. is performed for 1 to 24 hours. In a case in which a heating temperature when performing the homogenization treatment is less than 280° C. or a heating time is less than 0.5 hours, the homogenization treatment will be insufficient, and variation of the loss coefficient for every aluminum alloy substrate may increase. When the heating temperature when performing the homogenization treatment exceeds 620° C., the aluminum alloy ingot may melt. Even if the heating time of the homogenization treatment is extended beyond 30 hours, the effects thereof saturate, and further remarkable improvement effects cannot be obtained.

In the step S104, the aluminum alloy ingot (DC cast) which has been subjected to the homogenization treatment or, alternatively, has not been subjected to the homogenization treatment, is hot rolled to obtain a plate material (step S104). When hot rolling, the conditions thereof are not particularly limited, but it is preferable that a hot rolling starting temperature is from 250 to 600° C., and it is preferable that a hot rolling ending temperature is from 230 to 450° C.

Next, the hot rolled plate or the cast plate cast by the CC casting method is cold rolled to obtain an aluminum alloy plate having about 0.3 to 0.6 mm (step S105). The conditions of the cold rolling are not particularly limited. It is sufficient that the conditions be set in accordance with the required product plate strength and plate thickness, and it is preferable that a rolling ratio is set to 10 to 95%. Prior to the cold rolling or, alternatively, during the cold rolling, an annealing treatment may be performed to ensure cold rolling workability. When performing the annealing treatment, it is preferable that, for example, in the case of batch heating, the annealing treatment is carried out at 300 to 450° C. for 0.1 to 10 hours. In the case of continuous heating, the annealing treatment is carried out by holding at 400 to 500° C. for 0 to 60 seconds. Here, the holding time of 0 seconds means cooling immediately after the desired holding temperature is reached.

Then, the aluminum alloy plate obtained by the cold rolling is punched in a disc-shaped form to obtain a disc-shaped aluminum alloy plate. The disc-shaped aluminum alloy plate is formed into a disk blank by a pressure-flattening treatment (step S106). In the pressure-flattening treatment, while pressurization is performed by applying an applied load of 30 to 100 MPa on the disc-shaped aluminum alloy plate in the air, for example, pressure-annealing is performed for 0.5 to 10 hours at 200 to 450° C. to fabricate a flattened disk blank.

Prior to the zincate treatment and the like, the disk blank is subjected to cutting treatment/grinding treatment (step S107) and, if necessary, heat treating.

In the cutting/grinding treatment step, the inner and outer circumferences of the disk blank are cut to arrange the shape and grinding is performed on the principal surface. Prior to this step, as a preliminary treatment of the grinding, a record surface of the disk blank may be cut. In this step, chamfer processing may be performed further on the inner and outer circumferential end surfaces.

The grinding can be performed using No. 800 to 4000 SiC grinding stones and a commercially available batch type double-sided simultaneous polishing machine. This double-sided simultaneous polishing machine includes an upper surface plate and a lower surface plate made from cast iron, a carrier that holds a plurality of aluminum substrates between the upper surface plate and the lower surface plate, and SiC grinding stones mounted on contact surfaces of the upper surface plate and the lower surface plate with the aluminum substrates. In the grinding treatment, while the disk blank is held by the carrier, the respective upper and lower surface plates are rotated in opposite directions. The rotation speed of the upper and lower surface plates can be from 10 to 30 rpm. Since the carrier is rotated by a sun gear, the disk blank is ground while performing planetary motion on the grinding stones.

Additionally, to perform heat treating, the heat treating is performed under a condition of holding the disk blank at 200 to 350° C. for 5 to 60 minutes. Performing the heat treating allows removing distortion occurred in cutting/grinding treatment.

Next, the disk blank surface is subjected to degreasing/etching treatment (step S108).

The degreasing treatment can be performed according to an ordinarily method, and, for example, it is preferable that the degreasing treatment is performed under the conditions of a temperature of 40 to 70° C., a treating time of 3 to 10 minutes, and a concentration of 10 to 500 mL/L, using a commercially available degreasing solution or the like.

The etching treatment can be performed according to an ordinarily method, and, for example, it is preferable that the etching treatment is performed under the conditions of a temperature of 50 to 75° C., a treating time of 0.5 to 5 minutes, and a concentration of 1 to 50 mL/L, using a commercially available etching solution or the like.

Next, the disk blank surface is subjected to a zincate treatment (Zn replacement treatment) (step S109).

In the zincate treatment, a zincate film is formed on the disk blank surface. In the zincate treatment, a commercially available zincate treatment liquid can be used, and it is preferable that the treatment be carried out under the conditions of a temperature of 10 to 35° C., a treating time of 0.1 to 5 minutes, and a concentration of 100 to 500 mL/L. The zincate treatment is carried out at least one time, and may be carried out two or more times. By carrying out the zincate treatment a plurality of times, fine Zn can be deposited and a uniform zincate film can be formed. When carrying out the zincate treatment two or more times, a Zn stripping treatment can be performed between the zincate treatments. In the Zn stripping treatment, $HNO_3$ liquid is used, and it is preferable that the treatment be carried out under the conditions of a temperature of 15 to 40° C., a treatment time of 10 to 120 seconds, and a nitric acid concentration of 10 to 60%. Additionally, it is preferable that the second and subsequent zincate treatments are carried out under the same conditions as in the first zincate treatment.

Furthermore, the zincate treated disk blank surface is subjected to electroless Ni—P plating treatment as a base treatment for adhering the magnetic body (step S110). In the electroless Ni—P plating step, a commercially available plating solution or the like is used, and it is preferable that the plating is carried out under the conditions of a temperature of 80 to 95° C., a treatment time of 30 to 180 minutes, and a Ni concentration of 3 to 10 g/L.

Between respective processes from the degreasing treatment until the zincate treatment, pure water cleaning may be performed.

The plating surface after the electroless Ni—P plating is subjected to rough polishing step and rough polishing step as the polishing treatment for the purpose of flatten (step S111 and S112). In the polishing treatment step, as long as the root mean square deviation Rq of the surface roughness can be obtained, the details thereof are not particularly limited. It is preferable that the polishing be carried out in a plurality of stages in which the diameter of the polishing grains is adjusted. The polishing step is preferably performed in at least 2 phases in which the particle diameters of the polishing grains used are different. For example, a main surface is roughly polished using a polishing solution containing large-diameter polishing grains having a grain size of 0.03 μm or more and 1.0 μm or less and having an average particle diameter of 0.2 μm or more and 0.85 μm or less, and a hard or soft polishing pad. Next, fine polishing of the main surface is carried out using a polishing solution containing small-diameter polishing grains having a grain size of 0.01 μm or more and less than 0.1 μm and having an average particle diameter of 0.02 μm or more and 0.08 μm or less, and a soft polishing pad. As the small-diameter polishing grain in the fine polishing step, the one having the diameter smaller than the large-diameter polishing grain used in the rough polishing step is used. Note that, here, the term “hard” refers to a hardness (Asker C) of 85 or greater as measured by the measuring method defined in the standards of The Society of Rubber Science and Technology, Japan (applicable standard: SRIS0101), and the term “soft” refers to a hardness (Asker C) of 60 to 80. The average particle diameter (d50) is a so-called median diameter, and refers to a particle diameter at which the cumulative volume is 50% when the particle size distribution is measured by the laser diffraction scattering method and the total volume of the particles is defined as 100% in the cumulative distribution.

Since the other polishing conditions in the rough polishing step are affected by the aluminum alloy used, the process conditions from the step S101 to the step S110, and the like, it is difficult to unambiguously determine the other polishing conditions. However, for example, the rotation speed of the polishing surface plate can be from 5 to 35 rpm, the polishing solution supply speed can be from 10 to 500 ml/minute (more preferably from 50 to 500 mL/minute), the polishing time can be from 1 to 10 minutes, the processing pressure can be from 10 to 100 g/cm$^2$, and the amount of polishing can be from 0.1 to 10 μm. In the middle of the rough polishing step, the up and down in the plate thickness direction of the disk blank can be preferably inverted. The inversion may be performed one time or can be performed multiple times. Although a timing to invert the disk blank is not particularly limited, both surfaces of the disk blank are preferably equally polished, and it is more preferred that inversion is performed when the half of the entire polishing time of the rough polishing step passes.

Since the other polishing conditions in the fine polishing step are affected by the aluminum alloy used, the process conditions from the step S101 to the rough polishing, and the like, it is difficult to unambiguously determine the other polishing conditions. However, for example, the rotation speed of the polishing surface plate can be from 5 to 35 rpm, the polishing solution supply speed can be from 10 to 500 ml/minute (more preferably from 50 to 500 mL/minute), the polishing time can be from 1 to 10 minutes, the processing pressure can be from 10 to 100 g/cm$^2$, and the amount of polishing can be from 0.01 to 1 μm. In the middle of the fine polishing step, the up and down in the plate thickness direction of the disk blank can be preferably inverted. The inversion may be performed one time or can be performed multiple times. Although a timing to invert the disk blank is not particularly limited, both surfaces of the disk blank are preferably equally polished, and it is more preferred that inversion is performed when the half of the entire polishing time of the fine polishing step passes.

The rough polishing step and rough polishing step can be carried out using a commercially available batch-type double-sided simultaneous polishing machine. The double-sided simultaneous polishing machine includes an upper surface plate and a lower surface plate made from cast iron, a carrier that holds a plurality of disk blanks between the upper surface plate and the lower surface plate, and polishing pads that are attached to the contact surfaces of the upper surface plate and the lower surface plate with the disk blanks (that is, the number of polishing pads is twice the number of disk blanks). The carrier of the double-sided simultaneous polishing machine holds the plurality of disk blanks between the upper surface plate and the lower surface plate, and the upper surface plate and the lower surface plate clamp each of the disk blanks with a predetermined machining pressure. As a result, each of the disk blanks is clamped by polishing pads from above and below (parallel to gravity direction) at the same time. Next, the upper surface plate and the lower surface plate are rotated in mutually different directions while supplying a predetermined amount of the polishing solution between the polishing pads and each of the disk blanks. In this respect, the carrier is also rotated by the sun gear, and therefore the disk blank performs planetary motion. As a result, the disk blanks slide on the surfaces of the polishing pads, and both surfaces are simultaneously polished. Note that the polishing pad is porous (has a bag-shaped hole with an open surface), and therefore a polishing solution is supplied between the polishing pad and the disk blank via the polishing pad.

The polishing solution can be supplied to the polishing pad by the ordinary method. For example, the polishing solution can be supplied to the polishing pad via the pipe from a tank storing the polishing solution. The tank storing the polishing solution preferably includes stirring means.

The polishing solution is preferably supplied from the upper surface plate side to the polishing pad. "Supplied from the upper surface plate side to the polishing pad" specifically means that holes are provided in the upper surface plate and the polishing pad, and a grinding fluid is dropped to the holes from above to pour the grinding fluid.

As the polishing pad used in the rough polishing step and the fine polishing step, a porous polishing pad is used.

By the above-described polishing step (surface polishing) after the electroless Ni—P plating treatment, the aluminum alloy substrate for magnetic disk according to the present invention is produced.

The magnetic body adhering step (step 113) can be performed by the ordinary method. In the case of a general aluminum alloy substrate, the magnetic layer is formed by attaching a magnetic material on the surface of the aluminum alloy substrate.

<Glass Substrate>

Next, the glass substrate s described below.

Glass-ceramics such as amorphous glass and crystallized glass can be used as the material of the glass plate. From the perspectives of moldability, workability, and the surface roughness of the product, it is preferable that amorphous glass be used and, for example, it is preferable that aluminosilicate glass, soda lime glass, soda aluminosilicate glass, aluminoborosilicate glass, borosilicate glass, or the like is used.

Glass including $SiO_2$: 55 to 75% as a main component, and to which $Al_2O_3$: 0.7 to 25%, $Li_2O$: 0.01 to 6%, $Na_2O$: 0.7 to 12%, $K_2O$: 0 to 8%, MgO: 0 to 7%, CaO: 0 to 10%, $ZrO_2$: 0 to 10%, and/or $TiO_2$: 0 to 1% is added is preferable as a preferred embodiment of the glass used for the magnetic disk substrate.

The following will describe an example of a glass substrate for magnetic disk and a producing method of the magnetic disk using it.

As long as the producing method of the glass substrate for magnetic disk is a method that allows producing the magnetic disk substrate in which the root mean square deviation Rq of the surface roughness is in the range, the method is not particularly limited. From the aspect of the root mean square deviation Rq of the surface roughness in the range, the producing method of the glass substrate for magnetic disk at least preferably includes a step of rough polishing a principal surface using a polishing solution containing polishing grains having a particle diameter of 0.1 μm or more and 1.0 μm or less and an average grain size of 0.2 μm or more and 0.85 μm or less and a hard polishing pad, and subsequently a step of fine polishing the principal surface using the polishing solution containing the polishing grains having the particle diameter of 0.01 μm or more and less than 0.1 μm and an average grain size of 0.02 μm or more and 0.08 μm or less and a soft polishing pad. As the conditions in the rough polishing step and the fine polishing step, the conditions when the aluminum alloy substrate is produced can be applied. For example, polishing grains having a grain size of 0.03 μm or more and 1.0 μm or less can be used in the rough polishing step.

The rough polishing step corresponds to step S204 described below, and the fine polishing step corresponds to step S205 described below. The details of the rough polishing step and the fine polishing step can be referred to as the description in steps S204 and S205.

The rough polishing step and/or the fine polishing step is preferably a step that performs at least one step among the following preferred steps.

The rough polishing step and/or the fine polishing step is preferably a step that performs polishing while supplying the polishing solution from the upper surface plate side to the polishing pad.

The rough polishing step and/or the fine polishing step is preferably a step that performs polishing while supplying the polishing solution of 10 ml/minute or more per disk blank described later.

The rough polishing step and/or the fine polishing step is preferably a step that uses the polishing solution diluted using water having the electrical resistivity of 1 MΩ·cm or more.

In the rough polishing step and/or the fine polishing step, the polishing solution under stirring is preferably supplied to the polishing pad.

In the rough polishing step and/or the fine polishing step, in the middle of the polishing step, the up and down in the plate thickness direction of the disk blank is preferably inverted one time or more.

Prior to the rough polishing step and/or the fine polishing step, when a water having the electrical resistivity of 10 MΩ·cm or more is supplied from the inlet of the pipe to which the polishing solution being supplied, cleaning is preferably performed such that the electrical resistivity becomes to the extent of 1 MΩ·cm or more at the outlet of the pipe.

Figure 5:
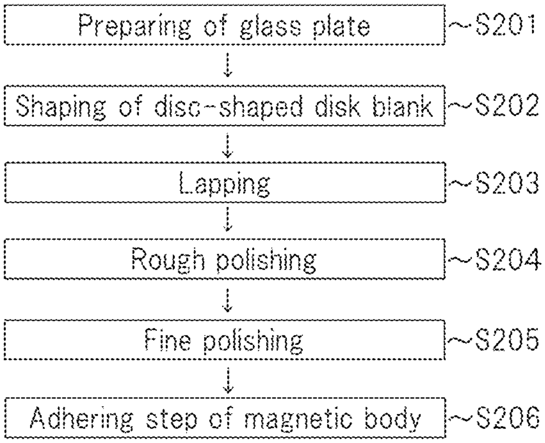
FIG. 5 is a flowchart illustrating a producing method of a magnetic disk glass substrate, and a magnetic disk using the same according to the present invention.

FIG. 5 is a flowchart illustrating an example of a producing method of the glass substrate and the magnetic disk using the same. As illustrated in FIG. 5, to produce the glass substrate, first, a glass plate having a predetermined thickness is prepared (step S201). Next, the prepared glass plate is cored and inner and outer circumferential end surface polishing is performed to form the disc-shaped disk blank (step S202). Further, as necessary, a step of lapping the disc-shaped disk blank is performed (step S203). Next, the rough polishing step that collectively clamps the formed or lapped disk blanks from up and down by the polishing pads and simultaneously polishes a plurality of disk blanks with cerium oxide abrasive grains (step S204) is performed. Next, the fine polishing step that further simultaneously polishes each of the disk blanks polished in the step S204 with colloidal silica abrasive grains is performed (step S205), and thus the glass substrate is produced. The produced glass substrate becomes the magnetic disk by the magnetic body adhering step (step S206).

Herein, specific descriptions are given for each step referring to FIG. 5.

Firstly, regarding the preparing of the glass plate of step S201, a known producing method such as a float method, a down draw method, and a direct press method, in which molten glass is the starting material, can be used. It is preferable that a redraw method is used because it is relatively easy to produce a glass plate having little variation in thickness. In such a redraw method, a base glass plate produced using the float method or the like is heated to soften, and stretched to a desired thickness.

Next, regarding the shaping of the disc-shaped disk blank in step S202, a disc-shaped disk blank is shaped from the glass plate, prepared in step S201, by the coring step and the inner and outer circumferential end surface polishing step. The shaped disk blank is a disc-shaped disk blank that has two main surfaces, and a round hole is formed at a center section thereof.

As necessary, the lapping step in the step S203 is performed, and the lapping is performed on the disc-shaped disk blank formed in the step S202, and thus the thickness of the disk blank can be adjusted. This lapping step is preferably performed when the variation in the thickness of the glass plate is large, such as when the redraw method was not employed in the step S201. The lapping step can be performed such that the variation in the thickness of the glass plate becomes around ±3 μm. The lapping step can be performed by the ordinary method and, for example, can be performed using a batch type double-sided polishing machine using a diamond pellet.

Next, polishing is performed on the principal surface of the disk blank obtained in the step S202 or S203. In this polishing step, it is preferable that the polishing be carried out in a plurality of stages in which the diameter of the polishing grains is adjusted. This polishing step at least includes the polishing in 2 phases, which are the rough polishing (S204) and the fine polishing (S205).

In the rough polishing step in the step S204, the principal surface of the disk blank is rough polished.

The rough polishing can be performed by using a polishing solution containing polishing grains having a grain size of 0.1 μm or more and 1.0 μm or less and having an average particle diameter of 0.2 μm or more and 0.85 μm or less, and a hard polishing pad.

The other polishing conditions of the rough polishing are preferably as follows. A hard polishing pad having a hardness from 86 to 88 is used, the rotation speed of the polishing surface plate is from 5 to 35 rpm, the sun gear rotation number is from 5 to 35 rpm, the polishing solution supply speed is from 10 to 500 ml/minute (more preferably from 50 to 500 mL/minute), the processing pressure is from 10 to 120 g/cm$^2$, the polishing time is from 1 to 10 minutes, and the amount of polishing is from 0.1 to 1.2 μm in one surface. As the polishing pad, a polishing pad made from hard polyurethane or the like is preferably used. Note that it is preferable that a solution containing polishing grains made from cerium oxide having a grain size of 0.1 μm or more and 1.0 μm or less and having an average particle diameter of 0.2 μm or more and 0.85 μm or less is used as the polishing solution.

In the middle of the rough polishing step, the up and down of the disk blank in the plate thickness direction can be preferably inverted. The inversion may be performed one time and can be performed multiple times. Although a timing to invert the disk blank is not particularly limited, both surfaces of the disk blank are preferably equally polished, and it is more preferred that inversion is performed when the half of the entire polishing time of the rough polishing step passes.

The rough polishing step and rough polishing step are carried out using a commercially available batch-type double-sided simultaneous polishing machine. In the producing method of the glass substrate as well, the double-sided simultaneous polishing machine described in the producing method of the aluminum substrate can be used.

Next, in the fine polishing step of the step S205, fine polishing is performed on the rough polished principal surface.

The fine polishing can be carried out by replacing the polishing pads of the double-sided simultaneous polishing machine with fine polishing soft polishing pads made from foamed urethane, for example, and using these polishing pads to polish the glass substrates while supplying a polishing solution containing polishing grains made of colloidal silica having a grain size of 0.01 μm or more and less than 0.1 μm and having an average particle diameter of 0.02 μm or more and 0.08 μm or less. Thus, the main surfaces of the disk blanks are mirror polished, and the magnetic disk glass substrate is produced.

The other polishing conditions of the fine polishing are preferably as follows. A soft polishing pad having a hardness from 75 to 77 is used, the rotation speed of the polishing surface plate is from 5 to 35 rpm, the sun gear rotation number is from 5 to 35 rpm, the polishing solution supply speed is from 10 to 500 ml/minute (more preferably from 50 to 500 mL/minute), the processing pressure is from 10 to 120 g/cm$^2$, the polishing time is from 1 to 10 minutes, and the amount of polishing is from 5 to 15 μm in one surface. The amount of polishing can be from 0.01 to 1 μm. In the middle of the fine polishing step, the up and down of the disk blank in the plate thickness direction can be preferably inverted. The inversion may be performed one time and can be performed multiple times. Although a timing to invert the disk blank is not particularly limited, both surfaces of the disk blank are preferably equally polished, and it is more preferred that inversion is performed when the half of the entire polishing time of the rough polishing step passes.

Note that, during the polishing step, a chemical strengthening treatment using a sodium nitrate solution or a potassium nitrate solution can be carried out.

The magnetic body adhering step (step S205) can be performed according to an ordinarily method.

EXAMPLES

The present invention will be described in more detail based on examples given below, but the invention is not meant to be limited by these.

In Examples 1 to 3 and in Comparative Examples 1 and 2, magnetic disk substrates having an outer diameter of 97 mm, an inner diameter of 25 mm, and a thickness of 0.50 mm were prepared. Details of the respective Examples will be described below.

Example 1

An A5086 alloy (aluminum alloy A) was melted according to an ordinary method, and DC casting (vertical semi-continuous casting) was performed to be a width 1310×plate thickness 500 mm to obtain a slab. Four surfaces of this slab were each face machined by 10 mm, and after homogenization treatment was performed at 540° C. for 6 hours, hot rolling was performed at a hot rolling start temperature of 540° C. and a hot rolling end temperature of 340° C. to obtain a hot rolling plate having a plate thickness of 3.0 mm. This hot rolling plate was cold-rolled to obtain a cold-rolling plate having a plate thickness of 0.48 mm.

This cold-rolling plate was punched by a press in an annular shape having an inner diameter of 24 mm and an outer diameter of 98 mm, and while pressurization was performed in the air using a continuous annealing furnace with application of an applied load of 30 MPa, pressure-annealing was performed at 320° C. for three hours, and pressure-flattening treatment was performed. Thus, a disk blank was obtained. Further, by cutting an inner and outer circumferences of the disk blank, the annular disk blank having an inner diameter of 25 mm and an outer diameter of 97 mm was obtained. In this respect, chamfer processing was simultaneously performed on inner and outer circumferential end surfaces.

Surface grinding was performed on the disk blank after this processing with No. 4000 SiC grinding stones to obtain the plate thickness of 0.46 mm. A degreasing treatment, an etching treatment, a 1st zincate treatment, a Zn peeling treatment, and a 2nd zincate treatment were performed on both surfaces of this disk blank as follows.

The degreasing treatment was performed by using a degreasing solution of AD-68F (trade name, made by C. Uyemura & Co., Ltd.), under the conditions of a temperature of 45° C., a treatment time of 3 minutes and a concentration of 500 ml/L.

The etching treatment was performed by using an etching solution of AD-107F (trade name, made by C. Uyemura & Co., Ltd.), under the conditions of a temperature of 60° C., a treatment time of 2 minutes and a concentration of 50 mL/L.

The 1st zincate treatment was performed by using a zincate treatment solution of AD-301F-3X (trade name, made by C. Uyemura & Co., Ltd.), under the conditions of a temperature of 20° C., a treatment time of 1 minute and a concentration of 200 mL/L.

The Zn peeling treatment was performed by using a commercially available nitric acid reagent, under the conditions of a temperature of 25° C., a treatment time of 60 seconds and a nitric acid concentration of 30%.

The 2nd zincate treatment was carried out under the same conditions as the 1st zincate treatment.

Between respective processes from the degreasing treatment until the 2nd zincate treatment, pure water cleaning was performed.

Afterwards, on both surfaces of the disk blank, an electroless Ni—P plating treatment was performed using a NIMUDEN HDX (trade name, made by C. Uyemura & Co., Ltd.) plating solution under conditions of a temperature of 88° C., a processing time of 130 minutes, and an Ni concentration of 6 g/L.

Further, the Ni—P plated disk blank was set to a double-sided simultaneous polishing machine (trade name: 9B double-sided grinding machine made by SPEEDFAM), the rough polishing step and the fine polishing step were performed to produce an aluminum alloy substrate. The following will give the description in detail.

As for the polishing conditions in the rough polishing step, a foamed urethane polishing pad having a hardness of 66 and a polishing solution of free abrasive grains obtained by adding pure water to aluminum oxide having a grain size of 0.03 μm or more and 0.1 μm or less and an average grain size of 0.85 μm were used. As other polishing conditions in the rough polishing step, the polishing solution was supplied from an upper surface plate side, and a rotation speed of a polishing surface plate was 35 rpm, a polishing solution supply speed was 100 ml/minute, a polishing time was 2 minutes, a processing pressure was 80 g/cm$^2$, and an amount of polishing was 1 μm. Further, the disk blank was inverted up and down in a plate thickness direction and installed and polished under the same conditions.

Next, the fine polishing step was performed. In the fine polishing step, a foamed urethane polishing pad having a hardness of 76 and a polishing solution of free abrasive grains obtained by adding pure water to colloidal silica having a grain size of 0.01 μm or more and less than 0.1 μm and an average grain size of 0.08 μm were used. As other polishing conditions in the fine polishing step, the polishing solution was supplied from an upper surface plate side, and a rotation speed of a polishing surface plate was 35 rpm, a polishing solution supply speed was 150 ml/minute, a polishing time was 2 minutes, a processing pressure was 80 g/cm$^2$, and an amount of polishing was 0.2 μm. Further, the disk blank was inverted up and down in a plate thickness direction and installed and polished under the same conditions.

As described above, in the rough polishing step and the fine polishing step, polishing was performed while the polishing solution was supplied at the polishing solution supply speed of 10 ml/minute or more per disk blank. To prepare the polishing solution used for the rough polishing and the fine polishing, in both cases, the abrasive grains were diluted using a water having an electrical resistivity of 1 MΩ·cm or more. In both cases of the rough polishing and the fine polishing, the polishing solution was continually stirred during the supply. To perform the rough polishing and the fine polishing, when a water having the electrical resistivity of 10 MΩ·cm or more was supplied from the inlet of the pipe to which the polishing solution was supplied, cleaning was performed such that the electrical resistivity became to the extent of 1 MΩ·cm or more at the outlet of the pipe.

Thus, the magnetic disk substrate of Example 1 was obtained.

Example 2

An Al—Fe—Mn—Ni-based alloy (alloy B) was melted according to an ordinary method, and DC casting (vertical semi-continuous casting) was performed to be a width 1310×plate thickness 500 mm to obtain a slab. Four surfaces of this slab were each face machined by 10 mm, and after homogenization treatment was performed at 520° C. for 6 hours, hot rolling was performed at a hot rolling start temperature of 520° C. and a hot rolling end temperature of 340° C. to obtain a hot rolling plate having a plate thickness of 3.0 mm. This hot rolling plate was cold-rolled to obtain a cold-rolling plate having a plate thickness of 0.48 mm. The alloy B contained Fe: 0.7 mass %, Mn: 0.9 mass %, and Ni: 1.7 mass, with the balance being Al and inevitable impurities. This cold-rolling plate was punched by a press in an annular shape having an inner diameter of 24 mm and an outer diameter of 98 mm, and while pressurization was performed in the air using a continuous annealing furnace with application of an applied load of 30 MPa, pressure-annealing was performed at 320° C. for three hours, and pressure-flattening treatment was performed. Thus, a disk blank was obtained. Further, by cutting an inner and outer circumferences of the disk blank, the annular disk blank having an inner diameter of 25 mm and an outer diameter of 97 mm was obtained. In this respect, chamfer processing was simultaneously performed on inner and outer circumferential end surfaces.

Surface grinding was performed on the disk blank after this processing with No. 4000 SiC grinding stones to obtain the plate thickness of 0.46 mm. A degreasing treatment, an etching treatment, a 1st zincate treatment, a Zn peeling treatment, and a 2nd zincate treatment were performed on both surfaces of this disk blank as follows.

The degreasing treatment was performed by using a degreasing solution of AD-68F (trade name, made by C. Uyemura & Co., Ltd.), under the conditions of a temperature of 45° C., a treatment time of 3 minutes and a concentration of 500 ml/L.

The etching treatment was performed by using an etching solution of AD-107F (trade name, made by C. Uyemura & Co., Ltd.), under the conditions of a temperature of 60° C., a treatment time of 2 minutes and a concentration of 50 mL/L.

The 1st zincate treatment was performed by using a zincate treatment solution of AD-301F-3X (trade name, made by C. Uyemura & Co., Ltd.), under the conditions of a temperature of 20° C., a treatment time of 1 minute and a concentration of 200 mL/L.

The Zn peeling treatment was performed by using a commercially available nitric acid reagent, under the conditions of a temperature of 25° C., a treatment time of 60 seconds and a nitric acid concentration of 30%.

The 2nd zincate treatment was carried out under the same conditions as the 1st zincate treatment.

Between respective processes from the degreasing treatment until the 2nd zincate treatment, pure water cleaning was performed.

Afterwards, on both surfaces of the disk blank, an electroless Ni—P plating treatment was performed using a NIMUDEN HDX (trade name, made by C. Uyemura & Co., Ltd.) plating solution and under conditions of a temperature of 88° C., a processing time of 130 minutes, and an Ni concentration of 6 g/L.

Further, the Ni—P plated disk blank was set to a double-sided simultaneous polishing machine (trade name: 9B double-sided grinding machine made by SPEEDFAM), the rough polishing step and the fine polishing step were performed to produce an aluminum alloy substrate. The following will give the description in detail.

As for the polishing conditions in the rough polishing step, a foamed urethane polishing pad having a hardness of 66 and a polishing solution of free abrasive grains obtained by adding pure water to aluminum oxide having a grain size of 0.03 μm or more and 0.1 μm or less and an average grain size of 0.85 μm were used. As other polishing conditions in the rough polishing step, the polishing solution was supplied from an upper surface plate side, and a rotation speed of a polishing surface plate was 35 rpm, a polishing solution supply speed was 100 ml/minute, a polishing time was 2 minutes, a processing pressure was 80 g/cm$^2$, and an amount of polishing was 1 μm. Further, the disk blank was inverted up and down in a plate thickness direction and installed and polished under the same conditions.

Next, the fine polishing step was performed. In the fine polishing step, a foamed urethane polishing pad having a hardness of 76 and a polishing solution of free abrasive grains obtained by adding pure water to colloidal silica having a grain size of 0.01 μm or more and less than 0.1 μm and an average grain size of 0.08 μm were used. As other polishing conditions in the fine polishing step, the polishing solution was supplied from an upper surface plate side, and a rotation speed of a polishing surface plate was 35 rpm, a polishing solution supply speed was 150 ml/minute, a polishing time was 3 minutes, a processing pressure was 80 g/cm$^2$, and an amount of polishing was 0.2 μm. Further, the disk blank was inverted up and down in a plate thickness direction and installed and polished under the same conditions.

As described above, in the rough polishing step and the fine polishing step, polishing was performed while the polishing solution was supplied at the polishing solution supply speed of 10 ml/minute or more per disk blank. To prepare the polishing solution used for the rough polishing and the fine polishing, in both cases, the abrasive grains were diluted using a water having an electrical resistivity of 1 MΩ·cm or more. In both cases of the rough polishing and the fine polishing, the polishing solution was continually stirred during the supply. To perform the rough polishing and the fine polishing, when a water having the electrical resistivity of 10 MΩ·cm or more was supplied from the inlet of the pipe to which the polishing solution was supplied, cleaning was performed such that the electrical resistivity became to the extent of 1 MΩ·cm or more at the outlet of the pipe.

Thus, the magnetic disk substrate of Example 2 was obtained.

Example 3

Using a redraw method, a glass plate made from aluminosilicate glass having a width of 100 mm and a length of 10 m or more was produced and a glass plate having a thickness of 0.6 mm was selected. Coring and end surface polishing of the inner and outer circumferences were performed on the selected glass plate to form a disc-shaped disk blank. Further, the formed disc-shaped disk blank was set to a double-sided simultaneous polishing machine, the rough polishing step and the fine polishing step were performed to produce a glass substrate.

As for the polishing conditions in the rough polishing step, a urethane polishing pad having a hardness of 87 (made by HAMAI COMPANY LIMITED: HPC-90D) and a polishing solution of free abrasive grains obtained by adding pure water to cerium oxide polishing grains having a grain size of 0.1 μm or more and 0.4 μm or less and an average grain size of 0.2 μm were used. Additionally, as other polishing conditions in the rough polishing step, the polishing solution was supplied from the upper surface plate side, the rotation speed of the polishing surface plate was 25 rpm, the sun gear rotation number was 10 rpm, a polishing solution supply speed was 150 ml/minute, a polishing time was 2 minutes, an amount of polishing was 1 μm in one surface, and a processing pressure was 120 g/cm$^2$. Further, the disk blank was inverted up and down in a plate thickness direction and installed and polished under the same conditions. In this step, the amount of polishing was 2 μm found by addition of both surfaces.

Next, in the fine polishing step, a foamed urethane polishing pad having a hardness of 76 (made by Fujibo Ehime Co., Ltd.) and a polishing solution of free abrasive grains obtained by adding pure water to colloidal silica having a grain size of 0.01 μm or more and less than 0.1 μm and an average grain size of 0.08 μm were used. As other polishing conditions in the fine polishing step, the polishing solution was supplied from an upper surface plate side, and a rotation speed of a polishing surface plate was 25 rpm, the sun gear rotation number was 10 rpm, a polishing solution supply speed was 150 ml/minute, a polishing time was 5 minutes, an amount of polishing was 0.2 μm in one surface, a processing pressure was 50 g/cm$^2$. Further, the disk blank was inverted up and down in a plate thickness direction and installed and polished under the same conditions. In this step, the amount of polishing was 0.4 μm found by addition of both surfaces.

As described above, in the rough polishing step and the fine polishing step, polishing was performed while the polishing solution was supplied at the polishing solution supply speed of 10 ml/minute or more per disk blank. To prepare the polishing solution used for the rough polishing and the fine polishing, in both cases, the abrasive grains were diluted using a water having an electrical resistivity of 1 MΩ·cm or more. In both cases of the rough polishing and the fine polishing, the polishing solution was continually stirred during the supply. To perform the rough polishing and the fine polishing, when a water having the electrical resistivity of 10 MΩ·cm or more was supplied from the inlet of the pipe to which the polishing solution was supplied, cleaning was performed such that the electrical resistivity became to the extent of 1 MΩ·cm or more at the outlet of the pipe.

Thus, the magnetic disk substrate of Example 3 was obtained.

Comparative Example 1

Except that the polishing process was performed under the following conditions, similarly to Example 1, the magnetic disk substrate was obtained.

As for the polishing conditions in the rough polishing step in Comparative Example 1, a foamed urethane polishing pad having a hardness of 66 and a polishing solution of free abrasive grains obtained by adding pure water to aluminum oxide having a grain size of 0.03 μm or more and 0.1 μm or less and an average grain size of 0.85 μm were used. As other polishing conditions in the rough polishing step, the polishing solution was supplied from an upper surface plate side, and a rotation speed of a polishing surface plate was 35 rpm, a polishing solution supply speed was 80 ml/minute, a polishing time was 4 minutes, a processing pressure was 100 g/cm$^2$, and an amount of polishing was 1 μm. The disk blank was not inverted.

Next, the fine polishing step was performed. In the fine polishing step, a foamed urethane polishing pad having a hardness of 76 and a polishing solution of free abrasive grains obtained by adding pure water to colloidal silica having a grain size of 0.01 μm or more and less than 0.1 μm and an average grain size of 0.08 μm were used. As other polishing conditions in the fine polishing step, the polishing solution was supplied from an upper surface plate side, and a rotation speed of a polishing surface plate was 35 rpm, a polishing solution supply speed was 150 ml/minute, a polishing time was 4 minutes, a processing pressure was 100 g/cm$^2$, and an amount of polishing was 0.2 μm. The disk blank was not inverted.

To perform the rough polishing and the fine polishing, when the water having the electrical resistivity of 10 MΩ·cm or more was supplied from the inlet of the pipe to which the polishing solution was supplied, the cleaning was not performed such that the electrical resistivity became 1 MΩ·cm or more at the outlet of the pipe.

Thus, the magnetic disk substrate of Comparative Example 1 was obtained.

Comparative Example 2

Except that the polishing process was performed under the following conditions, similarly to Example 2, the magnetic disk substrate was obtained.

As for the polishing conditions in the rough polishing step in Comparative Example 2, a foamed urethane polishing pad having a hardness of 66 and a polishing solution of free abrasive grains obtained by adding pure water to aluminum oxide having a grain size of 0.03 μm or more and 0.1 μm or less and an average grain size of 0.85 μm were used. As other polishing conditions in the rough polishing step, the polishing solution was supplied from an upper surface plate side, and a rotation speed of a polishing surface plate was 35 rpm, a polishing solution supply speed was 80 ml/minute, a polishing time was 2 minutes, a processing pressure was 100 g/cm$^2$, and an amount of polishing was 1 μm. The disk blank was not inverted.

Next, the fine polishing step was performed. In the fine polishing step, a foamed urethane polishing pad having a hardness of 76 and a polishing solution of free abrasive grains obtained by adding pure water to colloidal silica having a grain size of 0.01 μm or more and less than 0.1 μm and an average grain size of 0.08 μm were used. As other polishing conditions in the fine polishing step, the polishing solution was supplied from an upper surface plate side, and a rotation speed of a polishing surface plate was 35 rpm, a polishing solution supply speed was 150 ml/minute, a polishing time was 6 minutes, a processing pressure was 100 g/cm$^2$, and an amount of polishing was 0.2 μm. The disk blank was not inverted.

To perform the rough polishing and the fine polishing, when a water having the electrical resistivity of 10 MΩ·cm or more was supplied from the inlet of the pipe to which the polishing solution was supplied, cleaning was not performed such that the electrical resistivity became to the extent of 1 MΩ·cm or more at the outlet of the pipe.

Thus, the magnetic disk substrate of Comparative Example 2 was obtained.

(Measurement of Front Surface and Back Surface Rq)

The root mean square deviations Rq of the surface roughnesses of the fixed portions of the produced various magnetic disk substrates were measured.

Figure 6:
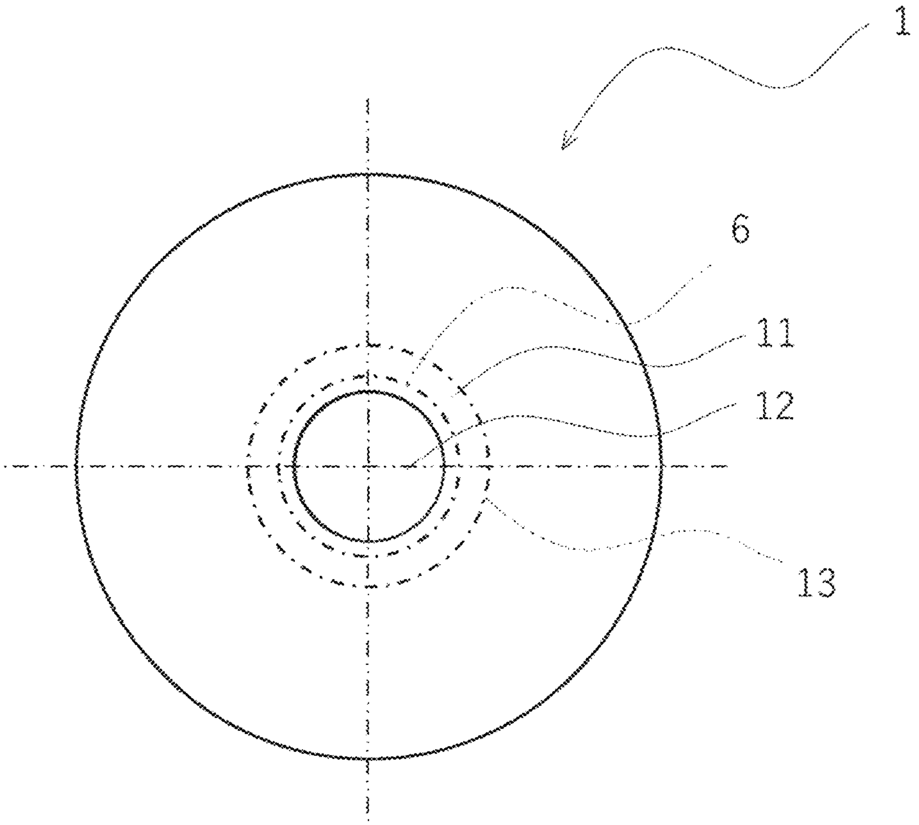
FIG. 6 is a schematic diagram describing a position on the magnetic disk substrate where Rq was measured in Example.

In this measurement, by measuring the root mean square deviation Rq of the surface roughness of a part of the fixed portion, the root mean square deviation Rq of the surface roughness of the fixed portion was represented. Positions on the magnetic disk substrates where the Rq was measured were on circumferences of 30 mm in radices from the centers of the magnetic disk substrates of the produced various magnetic disk substrates (that is, a portion indicated by an imaginary line 6 positioned inside the fixed portion 11 on the magnetic disk substrate 1 illustrated in FIG. 6).

The measurement was performed using an optical measuring instrument (made by Zygo, Mesa Horizontal Laser Interferometer (trade name)). A mode during the measurement was a mode to measure the surface roughness on the circumference. Using the obtained data and MetroPro8.3.3 software attached to the optical measuring instrument, the root mean square deviation Rq (μm) of the surface roughness was obtained. The measurement was performed on both of the principal surfaces of the magnetic disk substrate, the root mean square deviation Rq of the surface roughness of one principal surface was described in the "Front surface Rq" column in Table 1 and the root mean square deviation Rq of the surface roughness of the other principal surface was described in the "Back surface Rq" column in Table 1. Further, an absolute value of a difference ΔRq between the front surface Rq and the back surface Rq was described in the "Difference between front and back surfaces ΔRq" column.

(Measurement of Maximum Displacement H and Measurement of Attenuation Rate E)

For each of the produced magnetic disk substrates, the maximum value H of amount of displacement in the plate thickness direction of the outer circumferential end portion (the following measurement position of a sensor) of the magnetic disk substrate and the attenuation rate E of amount of displacement when the magnetic disk substrate was vibrated by an impact test were obtained as follows. This measurement was performed at room temperature (25° C.).

<Impact Test>

In a state where the magnetic disk substrate is sandwiched from above and below by fixing jigs at the fixed portions and horizontally fixed to a bearing with the impact of 490 $m/s^2$ for 2.8 msec is given to the bearing from downward in the normal direction (plate thickness direction) of the principal surface of the magnetic disk substrate.

For the measurement, an impact testing machine (made by AR Brown, SM-110-MP (trade name)) was used. This impact testing machine includes one test board, and by dropping this test board, an external impact at any given magnitude can be added to a device under test. Additionally, a displacement measuring device (made by Unipulse, UMA-500 (trade name)) was used. This displacement measuring device includes a capacitive sensor and measures an electrostatic capacity between a sensor and a measurement target to ensure calculating a distance between the sensor and the measurement target.

The magnetic disk substrate was mounted on the test board of the impact testing machine using a jig same as the one for the commercially available hard disk drive such that the principal surface of the magnetic disk substrate became parallel to the test board. The mounting was specifically performed as follows. First, the hard disk drive (12 TB HDD [HUH721212ALE600], made by WESTERN Digital, 8 magnetic disk substrates were mounted) was disassembled to take out fixing jigs (a disc clamper and spacers) made from an aluminum alloy and 6 screws having a nominal diameter of M2. Additionally, a bearing having the same shape as the bearing of the hard disk drive except that a length of a core was short (for one magnetic disk substrate) was prepared and fixed to the test board. One magnetic disk substrate was sandwiched by the fixing jigs (the disc clamper and the spacers) taken out from the hard disk drive, the 6 screws were screwed from above the disc clamper with a torque of 50 cN·m and assembled to the bearing. The magnetic disk substrate after the assembly was in contact with the fixing jigs in the fixed portion 11 disposed in the inner circumferential portion (the portion surrounded by the inner circumferential end portion and the circumference with a radius of 14.5 mm from the center of the magnetic disk substrate). The disc clamper had an outer diameter of 30 mm and a thickness of 5.6 mm. The spacer had an annular shape, an inner diameter of 25 mm, an outer diameter of 32 mm, and a thickness of 1.7 mm.

Figure 7A:
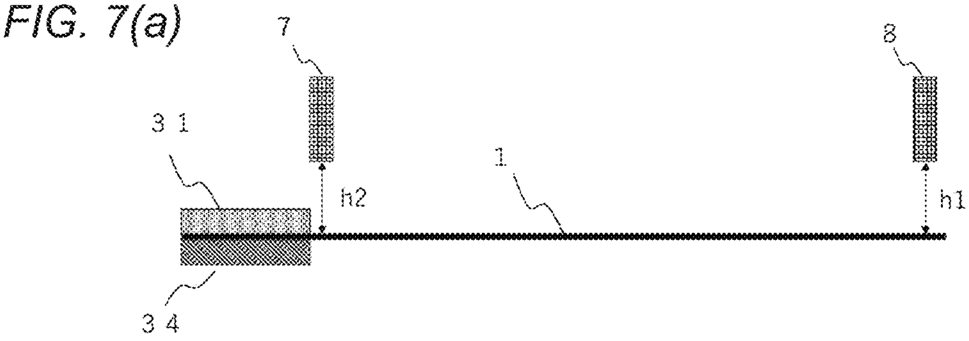
FIGS. 7(*a*) and 7(*b*) are a schematic diagram illustrating a relationship of arrangement of the magnetic disk substrate, an inner circumferential end portion sensor, and an outer circumferential end portion sensor when a maximum amount of displacement H and an attenuation rate E of amount of displacement were measured in Example viewed from a side surface direction of the magnetic disk substrate.
Figure 7B:
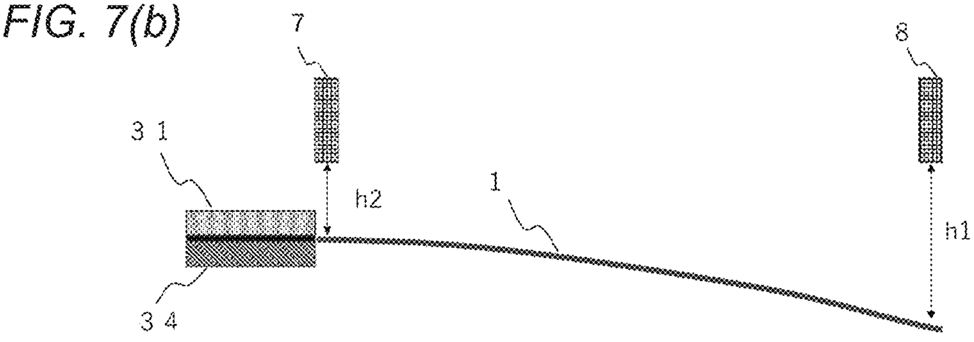

As illustrated in FIG. 7, to measure the amount of displacement of the outer circumferential end portion of the magnetic disk substrate generated in association with application of external impact, sensors of the displacement measuring device were mounted on the test board as an inner circumferential end portion sensor 7 and an outer circumferential end portion sensor 8. The inner circumferential end portion sensor 7 was mounted at a position 20 mm in the outer circumferential direction from the center of the magnetic disk substrate as the measurement target of the test board before vibration was given, and the outer circumferential end portion sensor 8 was mounted at a position 44.18 mm from the center of the magnetic disk substrate toward the outer circumferential direction such that distances between the magnetic disk substrate 1 and the sensors were able to be measured along a normal direction of the principal surface of the motionless magnetic disk substrate 1. FIG. 7 illustrates an end view of viewing arrangement of the inner circumferential end portion sensor 7 to the magnetic disk substrate 1 and the outer circumferential end portion sensor 8 to the magnetic disk substrate 1 in a horizontal direction (a perpendicular direction to the thickness direction of the magnetic disk substrate). In FIG. 7(*a*), the magnetic disk substrate 1 is in the motionless state (the state before application of the impact), and the inner circumferential end portion sensor 7 and the outer circumferential end portion sensor 8 are perpendicularly disposed with respect to the principal surface of the magnetic disk substrate 1. In FIG. 7(*a*), the magnetic disk substrate 1 is sandwiched between the disc clamper 31 and the spacer 34 at the fixed portion (not illustrated) and fixed to the bearing (not illustrated). Although the outer diameters of the disc clamper 31 and the spacer 34 are different, in FIG. 7(*a*), the outer diameters are illustrated to have the same diameter for simplification. A distance between the inner circumferential end portion sensor 7 and the principal surface of the magnetic disk substrate 1 (the one closer to the inner circumferential end portion sensor 7: an opposed principal surface) is defined as h2 and a distance between the outer circumferential end portion sensor 8 and the principal surface of the magnetic disk substrate 1 (the one closer to the outer circumferential end portion sensor 8: an opposed principal surface) is defined as h1. FIG. 7(*b*) illustrates an end view illustrating arrangement of the inner circumferential end portion sensor 7 and the outer circumferential end portion sensor 8 with respect to the magnetic disk substrate 1 that deforms due to vibration by application of impact and is bent downward. In FIG. 7(*b*), due to the deflection, both of h1 and h2 are larger than h1 and h2 in FIG. 7(*a*). Although not illustrated, due to vibration by impact, the magnetic disk substrate 1 vibrates in the plate thickness direction (the vertical direction), and the vibration attenuates as the time passes.

In the above-described impact testing machine, the test board was perpendicularly dropped, and the impact of 490 $m/s^2$ for 2.8 msec was given to the bearing from downward in the normal direction of the magnetic disk substrate principal surface. At this time, the distance (h1) between the outer circumferential end portion sensor 8 and the magnetic disk substrate 1 and the distance (h2) between the inner circumferential end portion sensor 7 and the magnetic disk substrate 1 were measured to obtain the amount of displacement from the motionless state to the vibration state of the distance between the outer circumferential end portion sensor and the outer circumferential end portion and the amount of displacement from the motionless state to the vibration state of the distance between the inner circumferential end portion sensor and the inner circumferential end portion (in both cases, unit: μm). A difference (h1−h2) between these amounts of displacement at the same time was calculated, and this difference was treated as the amount of displacement of the outer circumferential end portion of the magnetic disk substrate. Thus, by obtaining the amount of displacement of the outer circumferential end portion as the difference between the amounts of displacement h1 and h2 at 2 points of the inner circumferential end portion and the outer circumferential end portion on the magnetic disk substrate, an influence of displacement of the bearing can be removed. As illustrated in FIG. 8, when the obtained amount of displacement of the outer circumferential end portion is indicated in the amount of displacement-time graph (the vertical axis: amount of displacement (μm), the horizontal axis: time (msec)) with the displacement upward in the normal direction of the principal surface of the magnetic disk substrate as positive, an absolute value of the displacement that dropped significantly below first was the maximum amount of displacement H (μm), and an inclination when apexes of the displacement that significantly dropped at the first time and the second time due to vibration were connected as the attenuation rate E of amount of displacement (μm/msec).

In this test, the magnetic disk substrate was not rotated by the motor.

Table 1 shows the evaluation results.

In the magnetic disk substrates of Comparative Examples 1 and 2, the front surface Rq and the back surface Rq were too large, and the amount of displacement H failed to be reduced. Moreover, the attenuation rate E was small.

In the magnetic disk substrates of Examples 1 to 3, both of the front surface Rq and the back surface Rq were within the range from 0.01 to 0.44 μm, and the amount of displacement H was reduced. The attenuation rate E was also improved. It can be seen that, in the magnetic disk using the magnetic disk substrate of the present invention, the amount of displacement H can be reduced and the attenuation rate E can be improved. Therefore, the use of this magnetic disk allows improving the impact resistance of the hard disk drive.

When the maximum amount of displacement H when the impact of 490 $m/s^2$ for 2.8 msec is received is less than 171 μm, even when the magnetic disk substrate as the magnetic disk is incorporated in the hard disk drive in which a gap between the magnetic disk and the external member, such as the ramp, is 165 μm, the hard disk drive in which it is less likely that, due to contact of the magnetic head with the external member, such as the ramp, the ramp member is scraped or the like, leading to generation of the particles, and further in some cases, a scratch and a defect are less likely to occur on the surface of the magnetic disk can be configured.

Additionally, when the attenuation rate E when the impact of 490 $m/s^2$ for 2.8 msec is received is 17.7 μm/msec or more, even when a large vibration occurs in the magnetic disk when the magnetic disk substrate is incorporated in the hard disk drive as the magnetic disk, the vibration can be attenuated in a short time, and the number of contacts with the external member can be reduced. Additionally, in a situation where the magnetic disk does not rotate, repeated contact at the same position on the magnetic disk decreases. As a result, the hard disk drive in which generation of particles and a scratch and a defect of the surface of the magnetic disk are further less likely to occur can be configured.

| | Material | Front surface Rq (μm) | Back surface Rq (μm) | Difference between front and back surfaces ΔRq (μm) | Maximum displacement H (μm) | Attenuation rate E (μm/msec) |
|---|---|---|---|---|---|---|
| Ex. 1 | Aluminum alloy A | 0.44 | 0.33 | 0.11 | 164 | 17.7 |
| Ex. 2 | Aluminum alloy B | 0.39 | 0.40 | 0.01 | 165 | 18.1 |
| Ex. 3 | Glass | 0.16 | 0.17 | 0.01 | 125 | 19.3 |
| CEx. 1 | Aluminum alloy A | 0.86 | 0.79 | 0.07 | 176 | 13.9 |
| CEx. 2 | Aluminum alloy B | 0.61 | 0.83 | 0.22 | 171 | 14.2 |

Remarks: ‘Ex.’ means Example according to this invention, and “CEx.’ means Comparative Example.

The present invention has been described together with embodiments thereof. It is our intention that the invention should not be limited by any of the details of the description unless otherwise specified, but rather be construed broadly within its spirit and scope as set out in the attached claims.

DESCRIPTION OF SYMBOLS

1 Magnetic disk substrate
11 Fixed portion
12 Circular hole
13 Imaginary line
14 Principal surface
15 Inner circumferential end portion
2 Magnetic disk
21 Fixed portion
3 Fixing jig
31 Disc clamper
33 Bearing
33*a* Large-diameter portion of bearing
33*b* Core of bearing
34 Spacer
4 Screw
6 Imaginary line
7 Inner circumferential end portion sensor
8 Outer circumferential end portion sensor
S101 Preparing of aluminum alloy components
S102 Cast of aluminum alloy
S103 Homogenization treatment
S104 Hot rolling
S105 Cold rolling
S106 Pressure-flattening treatment
S107 Cutting treatment/Grinding treatment
S108 Degreasing/Etching treatment
S109 Zincate treatment
S110 Ni—P plating treatment
S111 Rough polishing
S112 Fine polishing
S113 Adhering of magnetic body
S201 Preparing of glass plate
S202 Shaping of disc-shaped disk blank
S203 Lapping step
S204 Rough polishing
S205 Fine polishing
S206 Adhering of magnetic body

The invention claimed is:

1. A hard disk device, having a ramp and a magnetic disk, wherein the magnetic disk is prepared using a magnetic disk substrate having a pair of front and back principal surfaces, wherein the magnetic disk substrate is an aluminum alloy substrate or a glass substrate, the magnetic disk substrate comprises fixed portions that are in contact with fixing jigs when the magnetic disk substrate configured as the magnetic disk is incorporated in the hard disk device on the respective front and back principal surfaces, wherein a root mean square deviation Rq of surface roughnesses of the fixed portions on the respective front and back principal surfaces is from 0.01 to 0.44 μm, and wherein when impact is given by a following impact test, a maximum value H of an amount of displacement in a plate thickness direction of an outer circumferential end portion of the magnetic disk substrate is 165 μm or less, and an attenuation rate E of the amount of displacement is 17.7 μm/msec or more; and wherein a gap between the magnetic disk and the ramp is less than 171 μm:

<Impact Test> in a state where the magnetic disk substrate is sandwiched from above and below by fixing jigs at the fixed portions and horizontally fixed to a bearing with the impact of 490 $m/s^2$ for 2.8 msec is given to the bearing from downward in a normal direction of the front principal surface of the magnetic disk substrate.

2. The hard disk device according to claim 1, wherein an absolute value of a difference ΔRq of Rq of the fixed portions of the front and back principal surfaces is from 0.01 to 0.11 μm.

3. The hard disk device according to claim 1, which is a disc-shaped magnetic disk substrate having an outer diameter of 97 mm or more, an inner diameter of 26 mm or less and a plate thickness of 0.5 mm or less.

* * * * *